United States Patent
Sakoda et al.

(10) Patent No.: US 6,563,881 B1
(45) Date of Patent: May 13, 2003

(54) COMMUNICATION METHOD AND TRANSMITTER WITH TRANSMISSION SYMBOLS ARRANGED AT INTERVALS ON A FREQUENCY AXIS

(75) Inventors: Kazuyuki Sakoda, Tokyo (JP); Mitsuhiro Suzuki, Tokyo (JP); Tomoya Yamaura, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/508,425

(22) PCT Filed: Jul. 9, 1999

(86) PCT No.: PCT/JP99/03734

§ 371 (c)(1),
(2), (4) Date: Oct. 13, 2000

(87) PCT Pub. No.: WO00/03508

PCT Pub. Date: Jan. 20, 2000

(30) Foreign Application Priority Data

Jul. 13, 1998  (JP) ............................................. 10-197574

(51) Int. Cl.$^7$ ................................................. H04K 1/10
(52) U.S. Cl. ...................................... 375/260; 275/132
(58) Field of Search ............................... 375/219, 221, 375/222, 259, 260, 240, 130, 132, 135, 136, 283, 330; 370/480, 485, 493

(56) References Cited

U.S. PATENT DOCUMENTS 5,903,614 A * 5/1999 Suzuki et al. ............... 370/208
5,907,583 A * 5/1999 Sakoda et al. ............... 375/260
6,188,717 B1 * 2/2001 Kaiser et al. ................ 375/148
6,243,423 B1 * 6/2001 Sakoda et al. ............... 375/262
6,381,234 B2 * 4/2002 Sakoda et al. ............... 370/336

OTHER PUBLICATIONS

A. Brajal, Orthogonal milticarrier techniques applied to direct sequence spread spectrum CDMA system, Proceedings of the IEEE Global Telecommunications Conference, pp. 1723–1728, Nov. 1993.*

* cited by examiner

Primary Examiner—Jean Corrielus
Assistant Examiner—Qutub Ghulamali
(74) Attorney, Agent, or Firm—Jay H. Maioli

(57) ABSTRACT

When multiplexing channels which conduct communication at various transmission rates, each communication is made capable of conducting communication processing, such as information reception, with a minimum required processing amount needed by itself. A plurality of communication channels are set in a predetermined band, and communication in each of the set channels is performed by using a multi-carrier signal having transmission symbols distributed among a plurality of subcarriers. Transmission symbols of each channel on a frequency axis are arranged at intervals of an Nth power of 2 (where N is an arbitrary positive number) with respect to a reference frequency interval for transmission. From the transmission signal, a signal component of a required channel is received.

13 Claims, 23 Drawing Sheets

FIG. 7A [32kbps]
FIG. 7B [64kbps]
FIG. 7C [96kbps]
FIG. 7D [128kbps]

FIG. 12
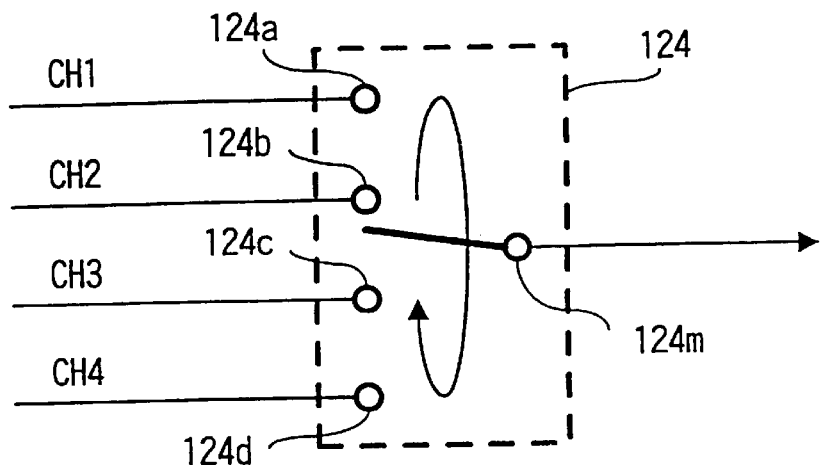
FIG. 13A  CH1 
FIG. 13B  CH2 
FIG. 13C  CH3 
FIG. 13D  CH4 

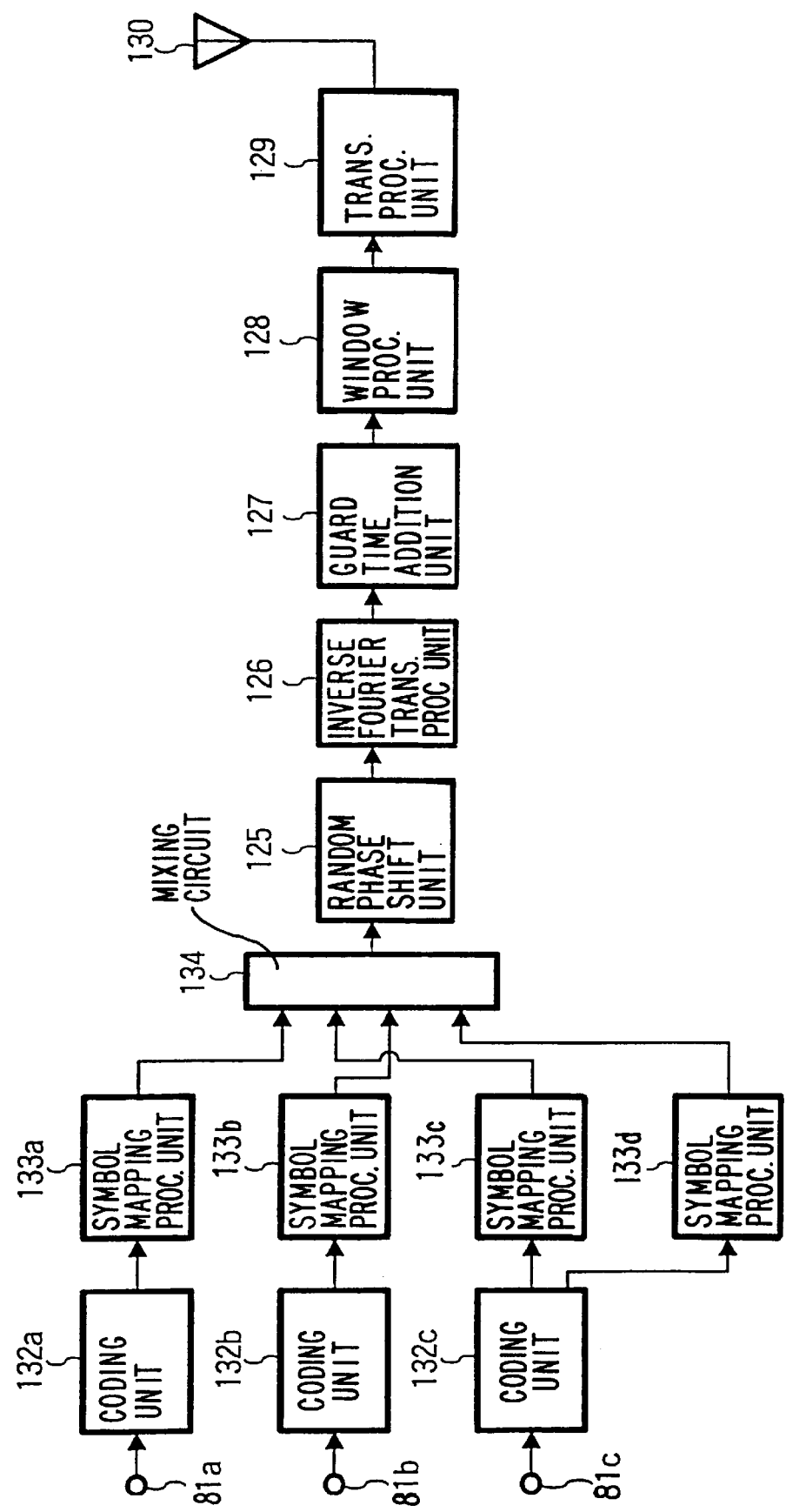

FIG. 17
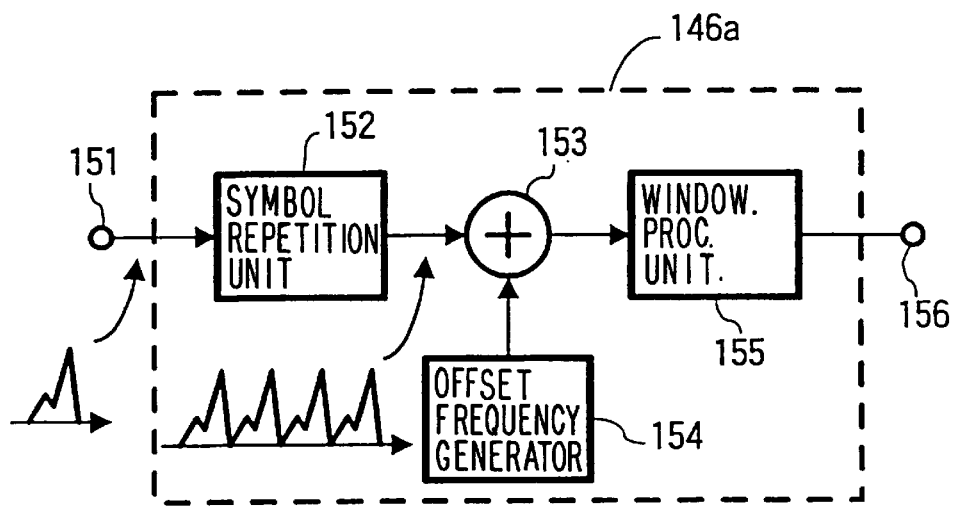
FIG. 18A
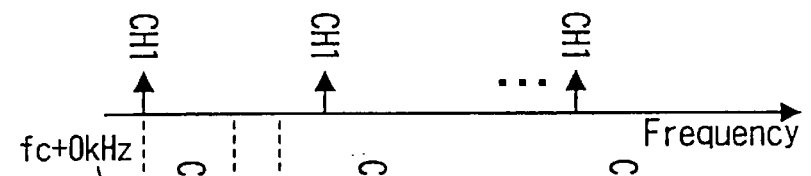
FIG. 18B
FIG. 18C
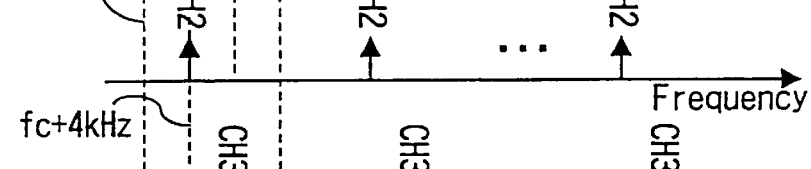
FIG. 18D
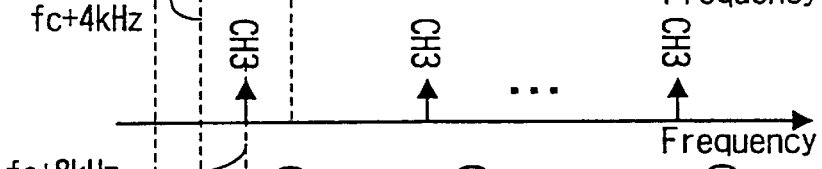
FIG. 18E
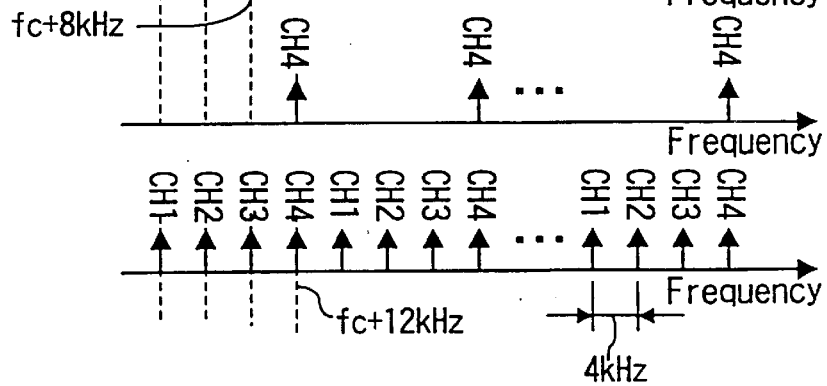

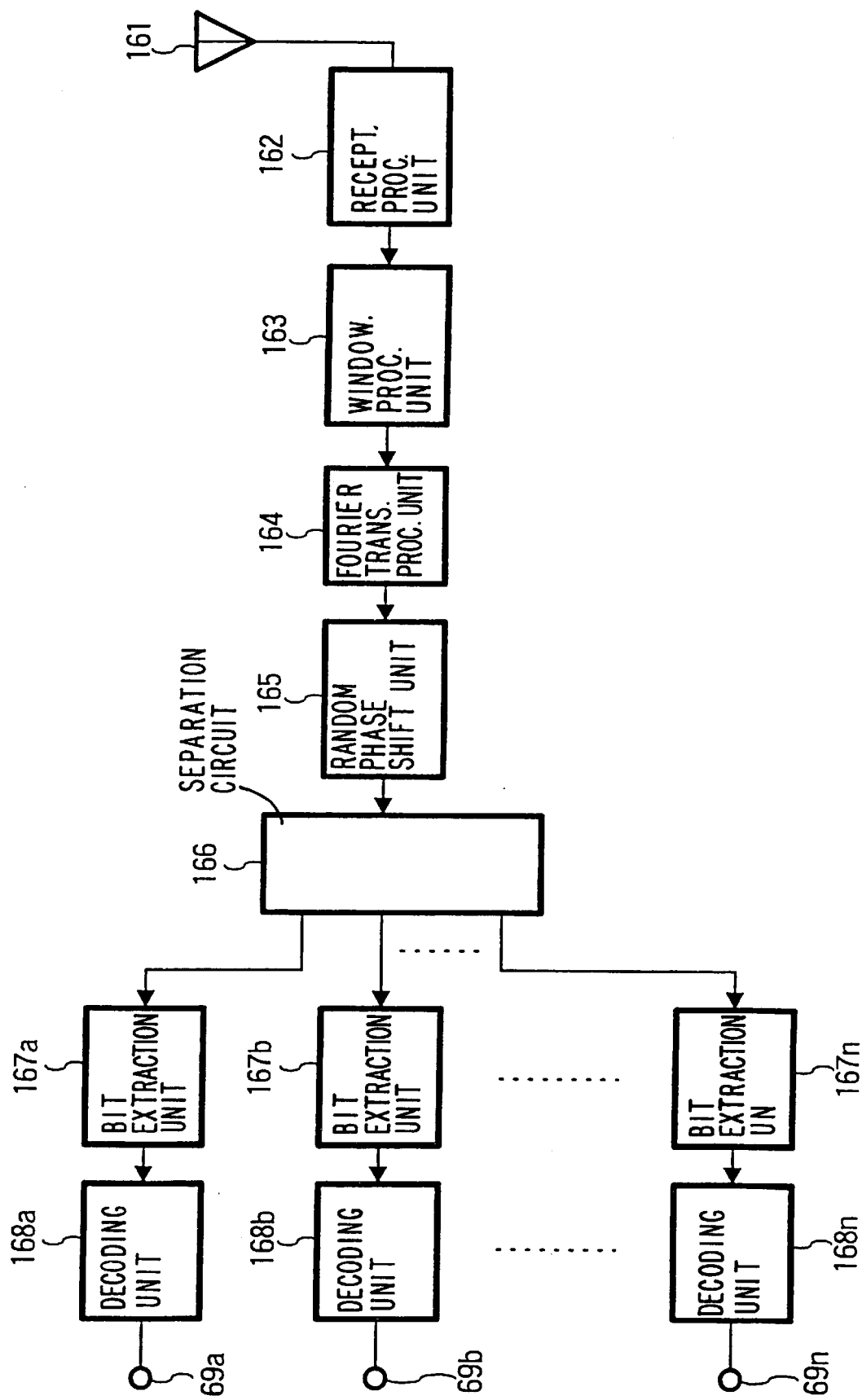

FIG. 24C 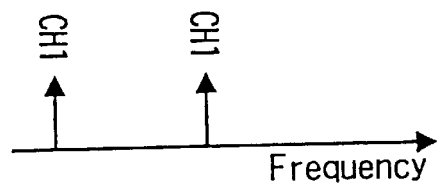 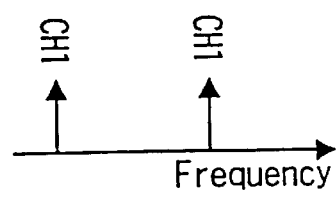
FIG. 24D 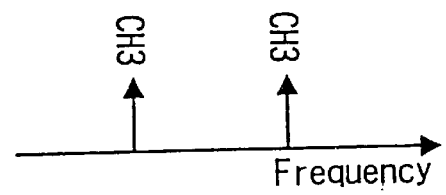 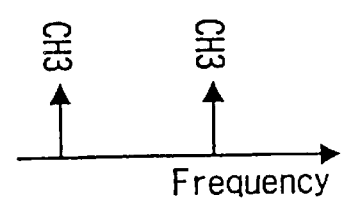

FIG. 24F 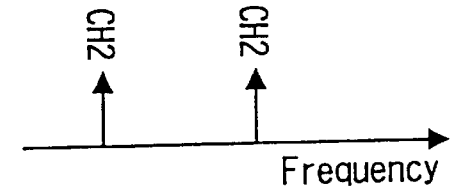 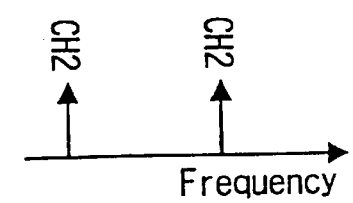
FIG. 24G 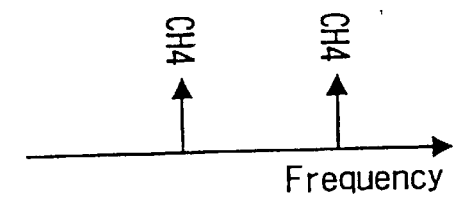 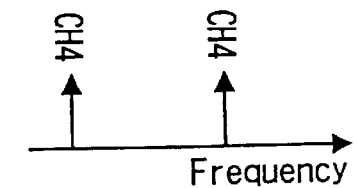

COMMUNICATION METHOD AND TRANSMITTER WITH TRANSMISSION SYMBOLS ARRANGED AT INTERVALS ON A FREQUENCY AXIS

This is a 371 of PCT/JP99/03734 filed on Jul. 9, 1999.

TECHNICAL FIELD

The present invention relates to a communication method in digital radio communication suitable for application to a radio communication system such as a radio telephone system using, for example, a cellular scheme, and to a transmitter and a receiver to which the communication method is applied.

BACKGROUND ART

As a conventional communication scheme for sharing a wide frequency band among a plurality of users and conducting communication efficiently, such as a radio telephone system, there is, for example, the DS-CDMA (Direct Sequence-Code Division Multiple Access) scheme. In this DS-CDMA scheme, a transmission signal sequence is spread (multiplied) by a code to generate a wide band signal, and this signal is transmitted. Furthermore, on a receiving side, a received signal is multiplied by the same spreading code as that of the transmission side to yield an effect called despreading. Only a desired signal component is thus extracted out of the received signal.

FIG. 1 shows a transmission configuration in a cellular radio communication system to which the conventional DS-CDMA scheme has been applied. An information bit stream obtained at an input terminal 1 is subjected to processing such as coding and interleaving in a coding unit 2, then supplied to a multiplier 3, and multiplied and spread therein by a code intended for channel assignment obtained at a terminal 3a. The spread bit stream is randomized in a multiplier 4 of a subsequent stage by a long code obtained at a terminal 4a, and thereafter mapped in a symbol mapping unit 5 to a transmission symbol. As for this mapping method, there are various techniques depending on the communication scheme.

The transmission signal mapped in the symbol mapping unit 5 is multiplexed in an adder 6 with transmission signals of other systems as occasion demands, supplied to a transmission processing unit 7, subjected to high frequency processing such as modulation therein, thereafter converted in frequency to a frequency band to be radio-transmitted, and radio-transmitted from an antenna 8.

Assuming now that the information bit stream obtained at the input terminal 1 is, for example, 8 kbps, it is encoded in the coding unit 2 with a coding rate 1/2. The bit rate of the coded bit becomes 16 kbps. If the coded bit is spread with a spreading factor 64 in the multiplier 3, a bit stream of 1024 kcps (where cps represents Chip Per Second) is obtained. If the information bit stream is different in bit rate, the bit rate of the transmission signal can be made constant by changing the spreading factor to be used in the multiplier 3.

Furthermore, as for other transmission systems added in the adder 6 as well, various information bit streams can be mixed as information bit streams supplied to the coding units 2 of respective transmission systems, provided that the bit stream of the transmission signal supplied to the adder 6 is constant.

A configuration for receiving the signal subjected to the transmission processing using the conventional DS-CDMA scheme will now be described by referring to FIG. 2. A signal of a predetermined frequency band received by an antenna 11 is subjected to frequency conversion in a reception processing unit 12 to form an intermediate frequency signal. The received signal thus subjected to the frequency conversion is demodulated to yield a baseband symbol sequence. Out of this symbol sequence, a received bit stream is extracted in a bit extraction unit 13. The received bit stream thus extracted is supplied to a multiplier 14, and multiplied and descrambled by a long code obtained at a terminal 14a. The multiplied output of the multiplier 14 is supplied to a multiplier 15, and multiplied by a despreading code obtained at a terminal 15a. Despreading processing is thus conducted, and a coded bit stream is obtained. The coded bit stream is decoded in a decoding unit 16, and an information bit stream is obtained at a terminal 17.

If a signal of the case where the above described information bit stream of 8 kbps is transmitted as the bit stream of 1024 kcps is received by the configuration of FIG. 2, then the signal is despread in the multiplier 15 with a despreading factor 64 and an information bit stream of 8 kbps is obtained. Furthermore, if the despreading factor of the despreading code obtained at the terminal 15a is changed, then an information bit stream of a different bit rate can be coped with.

In the description given so far, the case where information bit streams of a plurality of bit rates are mixed and radio-transmitted by using the DS-CDMA scheme has been described. Also in the case where they are radio-transmitted by using the TDMA (Time Division Multiple Access) scheme, however, it is also possible to mix information bit streams of a plurality of bit rates. FIG. 3 is a diagram showing the structure of one frame in the case of 8-TDMA structure in which one frame is formed of 8 time slots ranging from slot 1 to slot 8.

Assuming now slots to be assigned in the case where the transmission rate per slot is 8 kbps, for example, slots 1 and 2 are respectively assigned to users A and B having a transmission rate of 8 kbps and communication of the transmission rate of 8 kbps is conducted by using the slot 1 or 2. Furthermore, two slots composed of slot 3 and slot 4 are assigned to a user C having a transmission rate of 16 kbps and communication of 16 kbps is conducted. Furthermore, four slots composed of slots 5 through 8 are assigned to a user D having a transmission rate of 32 kbps and communication of 32 kbps is performed. According to the transmission rate at the time of a transmission request from each user, a base station or the like thus sets the number of slots in one frame to each user variably. As the result, it is possible to cope with the TDMA scheme by accommodating information bit streams having a plurality of bit rates mixedly and radio-transmitting them.

Furthermore, in the case where radio transmission is performed using a multi-carrier scheme called OFDM (Orthogonal Frequency Division Multiplex) scheme, for example, the configuration shown in FIG. 4 of a prior art is used as the transmission configuration. This configuration is a configuration applied to DAB (Digital Audio Broadcasting). An information bit stream obtained at a terminal 21 is subjected to processing such as coding in a coding unit 22, and thereafter mapped to transmission symbols in a symbol mapping unit 23. The transmission symbols are supplied to a mixing circuit 24, and multiplexed with other transmission data therein. As for the multiplexing conducted here, transmission data are simply coupled in series to generate a multiplexed symbol stream. For example, if symbols having 64 ksps per channel are multiplexed by 18 channels, then the transmission rate of the multiplexed symbol stream becomes 64 ksps×18=1152 ksps.

This multiplexed symbol stream is subjected to symbol rearrangement performed by frequency interleaving in a frequency conversion unit 25. As a result, symbols of respective channels are scattered. The rearranged symbol stream is converted into a multi-carrier signal arranged on the frequency axis by inverse Fourier transform processing in an inverse Fourier transform circuit (IFFT circuit) 26. The output of this IFFT circuit 26 is subjected to radio transmission processing in a radio processing unit 27, and radio-transmitted in a predetermined frequency band.

As for a configuration of the receiving side of this multi-carrier signal, a signal of a desired frequency band received by an antenna 31 is converted to a baseband signal in a reception processing unit 32 as shown in FIG. 5. Here, the baseband signal component of the multi-carrier signal is a signal having information pieces arranged on the frequency axis. Therefore, the multi-carrier signal is supplied to a fast Fourier transform circuit (FFT circuit) 33 and subjected to Fourier transform processing. As a result, subcarriers arranged on the frequency axis are extracted. At this time, symbols outputted by the Fourier transform processing become subcarriers of the whole received signal band.

The transformed signal of the subcarriers is supplied to a symbol selection unit 34. From symbol existence positions of a desired channel arranged by the frequency interleaving conducted on the transmission side, symbols are extracted. A symbol stream thus extracted is supplied to a bit extraction unit 35, where a coded bit stream is extracted. This coded bit stream is supplied to a decoding unit 36, and an information bit stream is obtained at an output terminal 37.

In this conventional OFDM scheme, multiplexing is conducted by assigning symbols of different channels to respective subcarriers. Therefore, the Fourier transform circuit (FFT circuit) possessed by the receiver performs transform processing on symbols corresponding to all multiplexed and transmitted channels, and channel selection is performed after the transform.

In the communication system of a cellular scheme to which the above described DS-CDMA scheme has been applied, data transmission of a variable rate is made possible by fixing the used frequency band and varying the spreading factor. By fixing the used frequency range, it will be possible to form a terminal device which provides variable bit rate service by using only a single high frequency circuit.

In the DS-CDMA scheme, however, the communication control scheme is very complicated. For example, in the case where it is applied to the cellular scheme, it is necessary to conduct hand off processing for switching over the base station, transmission power control for preventing any interference with other communication within the system, and the like with very high precision. Furthermore, in the DS-CDMA scheme, basically all channels share the same frequency band, and orthogonality of channels is not present. Therefore, the DS-CDMA scheme has a risk that the whole system does not function when there is even one terminal device in which transmission power control is not performed properly. It cannot be said that the system is suitable for performing complicated processing such as variable transmission rate.

Furthermore, in the case where variable transmission rate processing is applied to the DS-CDMA scheme, as regards the demodulation part, even a terminal device which makes communication at a low transmission rate of approximately several kbps needs to perform computational processing equivalent to that of a terminal device which conducts communication at the highest transmission rate possible in the system. As the result, the amount of computational processing in the terminal device significantly increases.

On the other hand, in the case where a variable transmission rate is implemented in a communication system to which the above described TDMA scheme is applied, the maximum transmission rate per channel is basically limited to [bit rate at the time when one slot is assigned]×[the number of TDMAS]. The upper limit and the lower limit of the transmission rate are determined by the number of TDMAs. In the case where the variation range of the transmission rate is very large, such as approximately several kbps to approximately 100 kbps, therefore, it is substantially impossible to cope with the transmission rate that a user desires only by slot assignment. It is not impossible if a very large number of time slots are provided in one frame. From the viewpoint of communication control or the like, however, it is not practical.

Furthermore, in the case where multiplexing using a variable transmission rate is implemented in a communication system to which the above described conventional OFDM system is applied, multiplexing is conducted by assigning symbols of different channels to respective subcarriers. The Fourier transform circuit included in the receiver needs to perform transform processing on symbols corresponding to all multiplexed and transmitted channels. This results in a problem that a large amount of transform processing is required.

DISCLOSURE OF INVENTION

An object of the present invention is to make possible of information communication processing in a communication means such as a receiver with a minimum processing amount needed by itself when multiplexing channels through which communication is made at various transmission rates.

A communication method in accordance with a first invention, includes: setting a plurality of channels in a predetermined band; and conducting communication in each of the set channels by using a multi-carrier signal having transmission symbols distributed among a plurality of subcarriers, wherein the transmission symbols of each channel on a frequency axis are arranged at intervals of Nth power of 2 (where N is an arbitrary positive number) with respect to a reference frequency interval. In a transmission signal formed of a multi-carrier signal having multiplexed channels, therefore, transmission symbols of each channel are arranged at a predetermined frequency interval. On the transmission side, therefore, processing of forming a multiplexed transmission signal can be performed simply. In addition, it can easily be made to extract only signals of each channel and process for reception. The configuration of the reception side can be simplified. Furthermore, in the case of application to radio communication, wide-band communication is performed with broad subcarrier intervals and consequently it also becomes possible to obtain a frequency diversity effect.

In accordance with a second invention, the communication in the communication method according to the first invention is defined to be radio communication. Since wide-band communication is made with broad subcarrier intervals, therefore, it also becomes possible to obtain a frequency diversity effect.

In accordance with a third invention, a value of N in the communication method according to the first invention is variably set depending on a bit rate of transmission data. As a result, it will be easy to transmit data having different bit rates mixed together.

In accordance with a fourth invention, the communication method according to the first invention is applied to communication between a base station and a terminal device; one channel of down channels transmitted from the base station is secured as a pilot channel whereas remaining channels are used as traffic channels; in the base station, a known signal is transmitted by using said pilot channel; and in the terminal device, equalization processing of a transmission path of symbols received via said traffic channel is performed by using symbols received via the pilot channel, and synchronous detection of the symbols subjected to the equalization processing is performed. As a result, equalization processing of transmission signals can be performed easily and favorably.

In accordance with a fifth invention, a signal to be transmitted in the communication method according to the first invention is subjected to frequency hopping by taking a channel as a unit or by taking a frequency as a unit. As a result, multiplexed signals are spread and transmitted efficiently, and a favorable transmission state can be ensured.

In accordance with a sixth invention, a communication method includes: setting a plurality of channels in a predetermined band; conducting communication in each of the set channels by using a multi-carrier signal having transmission symbols distributed among a plurality of subcarriers; using subcarriers of every predetermined number of subcarriers, as subcarriers assigned to each channel; performing differential modulation between adjacent subcarriers among subcarriers assigned to each channel and thereafter performing transmission; and performing differential demodulation between adjacent subcarriers on a reception side. As a result, there is formed a multi-carrier signal using subcarriers of every predetermined number as channel arrangement. In addition, since the differential modulation is performed between adjacent subcarriers of each channel, it will be possible to perform transmission processing and reception processing by using only signals of each channel.

A seventh invention is such that, in the communication method according to the sixth invention, on a transmission side, differential modulation is performed between adjacent subcarriers on a frequency axis instead of performing differential modulation between adjacent subcarriers among subcarriers assigned to each channel; and on a reception side, differential demodulation is performed between adjacent subcarriers on a frequency axis instead of performing differential demodulation between adjacent subcarriers among subcarriers assigned to each channel. As a result, transmission processing becomes possible also by virtue of processing based on the arrangement of subcarriers on the frequency axis.

An eighth invention is a transmitter wherein: a multi-carrier signal having transmission symbols distributed among a plurality of subcarriers is generated; transmission symbols are arranged on a frequency axis in one channel of said multi-carrier signal, at intervals of Nth power of 2 (where N is an arbitrary positive number) with respect to a reference frequency interval; and the generated multi-carrier signal is transmitted as a predetermined channel among a plurality of channels set in a predetermined band. As a result, a multi-carrier signal having transmission symbols of each channel arranged at predetermined frequency intervals and having multiplexed channels is transmitted. Transmission symbols of each channel can be arranged by fixed processing. Such a transmission signal that allows easy multiplexing by means of simple processing can be formed.

In accordance with a ninth invention, a value of N in the transmitter according to the eighth invention is variably set depending on a bit rate of transmission data. As a result, it becomes easy to transmit data having different bit rates mixed together.

A tenth invention is such that, in the transmitter according to a eighth invention, transmission symbols of a plurality of channels are individually generated, and thereafter a multiplexed symbol sequence is generated by arranging symbols of respective channels symbol by symbol; multi-carrier signal generation processing is performed on the generated multiplexed symbol sequence collectively; and transmission processing is performed on a plurality of channels collectively. As a result, transmission processing of a plurality of channels can be performed collectively by using a simple configuration.

An eleventh invention is such that, in the transmitter according to the eighth invention, transmission symbols are generated, the generated transmission symbols being taken out as a signal on a time axis, and thereafter processing for convolving a frequency offset corresponding to a channel assigned to its own station being performed. As a result, processing for transmission at a desired frequency can be performed favorably by using a simple configuration.

A twelfth invention is such that, in the transmitter according to the eighth invention, a known signal is transmitted by using one channel among a plurality of transmission channels as a pilot channel, and transmission processing is performed by using remaining channels as traffic channels. As a result, transmission control can be performed favorably on the basis of the known signal transmitted via the pilot channel.

In accordance with a thirteenth invention, the transmitter according to the eighth invention includes frequency hopping means for performing frequency hopping on the generated multi-carrier signal by taking a channel as a unit or taking a predetermined frequency band as a unit. As a result, a frequency/interference diversity effect is obtained, resulting in more satisfactory transmission.

A receiver in accordance with a fourteenth invention receives a multi-carrier signal having transmission symbols distributed among a plurality of subcarriers, and performs reception processing on transmission symbols received in one channel at frequency intervals of Nth power of 2 (where N is an arbitrary positive number) with respect to a reference frequency interval. As a result, a multi-carrier signal having transmission symbols of each channel arranged at predetermined frequency intervals and having multiplexed channels can be received. By extracting transmission symbols at predetermined frequency interval and performing reception processing, a signal of a desired reception channel can be obtained. From a multiplexed and transmitted signal, a signal of a desired channel can be obtained easily.

A fifteenth invention is such that, in the receiver according to the fourteenth invention, among all symbols transmitted in a bandwidth used for communication, only symbols of a communication channel transmitted by a transmission side are extracted from a received signal; and the extracted symbols are supplied to a channel decoder for decoding. As a result, reception processing of only needed symbols can be performed efficiently.

A sixteenth invention is such that, in the receiver according to the fourteenth invention, sampling of a received signal is performed at a sample rate determined by a bandwidth of the received signal; by performing addition or subtraction on sampled symbols, a desired reception channel is selected to decrease the number of symbols outputted to a subsequent stage, and a required minimum sample rate determined by a maximum bit rate at time of reception is made; and reception processing is performed on received data having a number of symbols corresponding to the required minimum sample rate. As a result, received data having the number of symbols corresponding to the required minimum sample rate can be obtained efficiently.

In accordance with a seventeenth invention, the receiver according to the sixteenth invention includes a correction means for multiplying data of at least one reception channel by a sine wave offset correction signal when a plurality of reception channels has been selected. As a result, offset contained between data of each received channel can be removed simply.

An eighteenth invention is such that, in the receiver according to the sixteenth invention, reception processing means for performing reception processing on said received data has processing capability determined by a maximum bit rate, and when conducting communication at a bit rate lower than said maximum bit rate, only desired bits are extracted. As a result, an amount of data processed at the time of communication using a low bit rate can be reduced.

A nineteenth invention is such that, in the receiver according to the fourteenth invention, reception processing means of a pilot channel and reception processing means of traffic channels are provided, and the reception processing means of traffic channels performs traffic path equalization processing of a transmission path of received symbols of a traffic channel by using symbols of a known signal received by the reception processing means of the pilot channel. As a result, the equalization processing of the transmission path of the received symbols of a traffic channel can be performed favorably on the basis of the received signal of the pilot channel, which leads to good reception processing.

In accordance with a twentieth invention, the receiver according to the fourteenth invention includes frequency hopping means for performing frequency hopping on a received signal by taking a channel as a unit or taking a predetermined frequency band as a unit. As a result, reception processing of the transmission signal subjected to frequency hopping can be performed properly.

BRIEF DESCRIPTION OF DRAWINGS

FIG. 12 is a configuration diagram showing an example of a mixing circuit according to a second embodiment of the present invention.

FIGS. 13A–13E are diagrams showing examples of a mixed state according to the second embodiment of the present invention.

FIG. 14 is a block diagram showing an example of a transmission configuration according to a third embodiment of the present invention.

FIG. 17 is a block diagram showing a configuration example of an internal channel selection unit according to the fourth embodiment of the present invention.

FIGS. 18A–18E are diagrams showing arrangement example of subcarriers according to the fourth embodiment of the present invention.

FIG. 19 is a block diagram showing an example of a reception configuration according to the fourth embodiment of the present invention.

FIGS. 24A–24G are diagram showing an example of processing performed in the channel selection unit according to the fifth embodiment of the present invention.

BEST MODE FOR CARRYING OUT THE INVENTION

A first embodiment of the present invention will be described below by referring to FIGS. 6 through 10.

Figure 1:
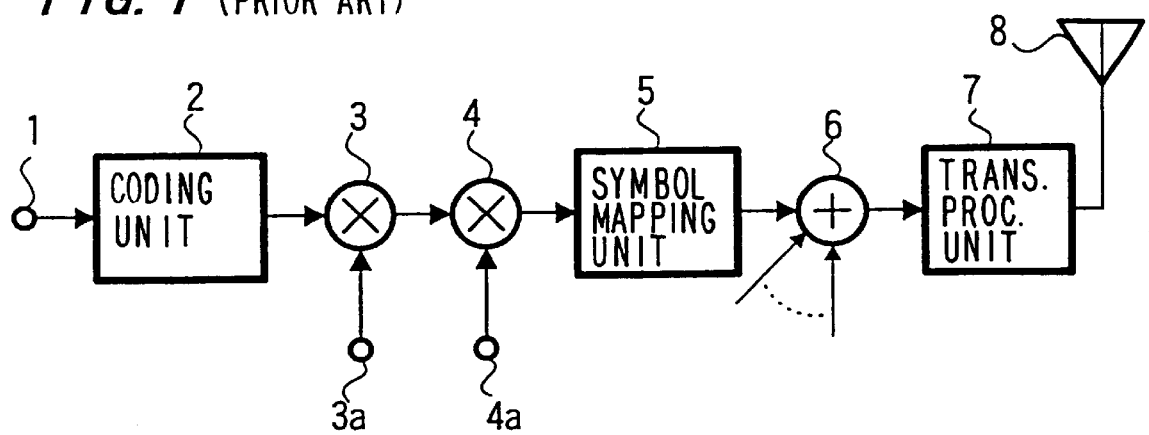
FIG. 1 is a block diagram showing an example of transmission processing of a conventional DS-CDMA scheme.
Figure 2:
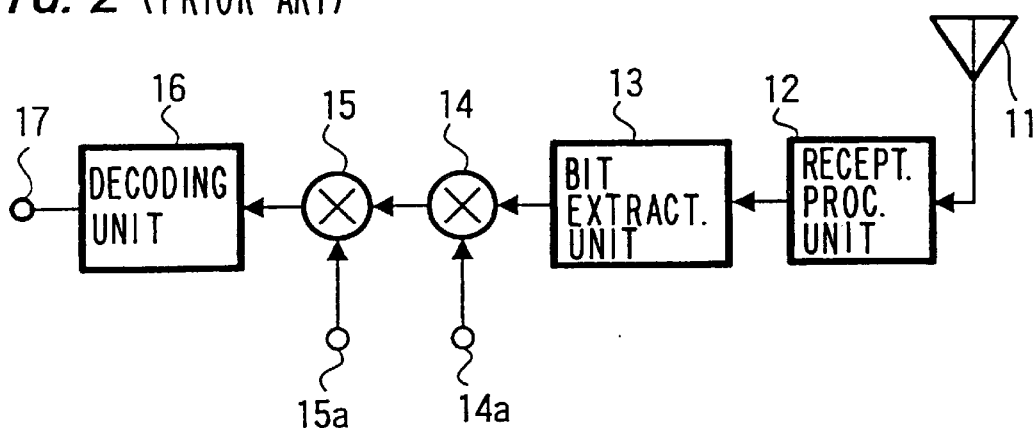
FIG. 2 is a block diagram showing an example of reception processing of a conventional DS-CDMA scheme.
Figure 3:
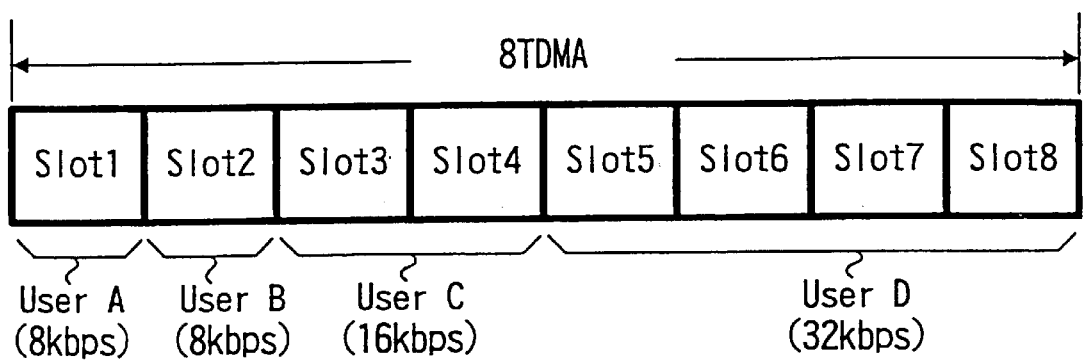
FIG. 3 is a diagram for description showing an example of multiplexing in the conventional TDMA scheme.
Figure 4:
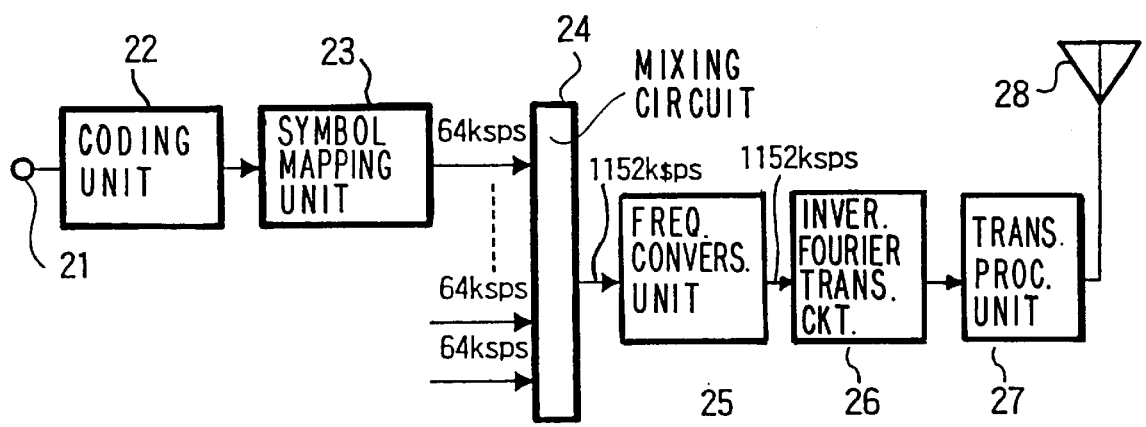
FIG. 4 is a block diagram showing an example of transmission processing of a conventional OFDM scheme.
Figure 5:
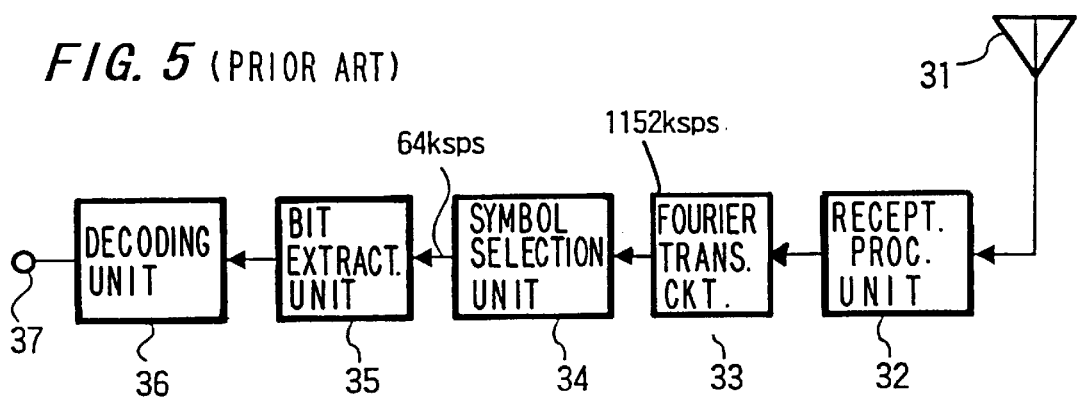
FIG. 5 is a block diagram showing an example of reception processing of a conventional OFDM scheme.
Figure 6:
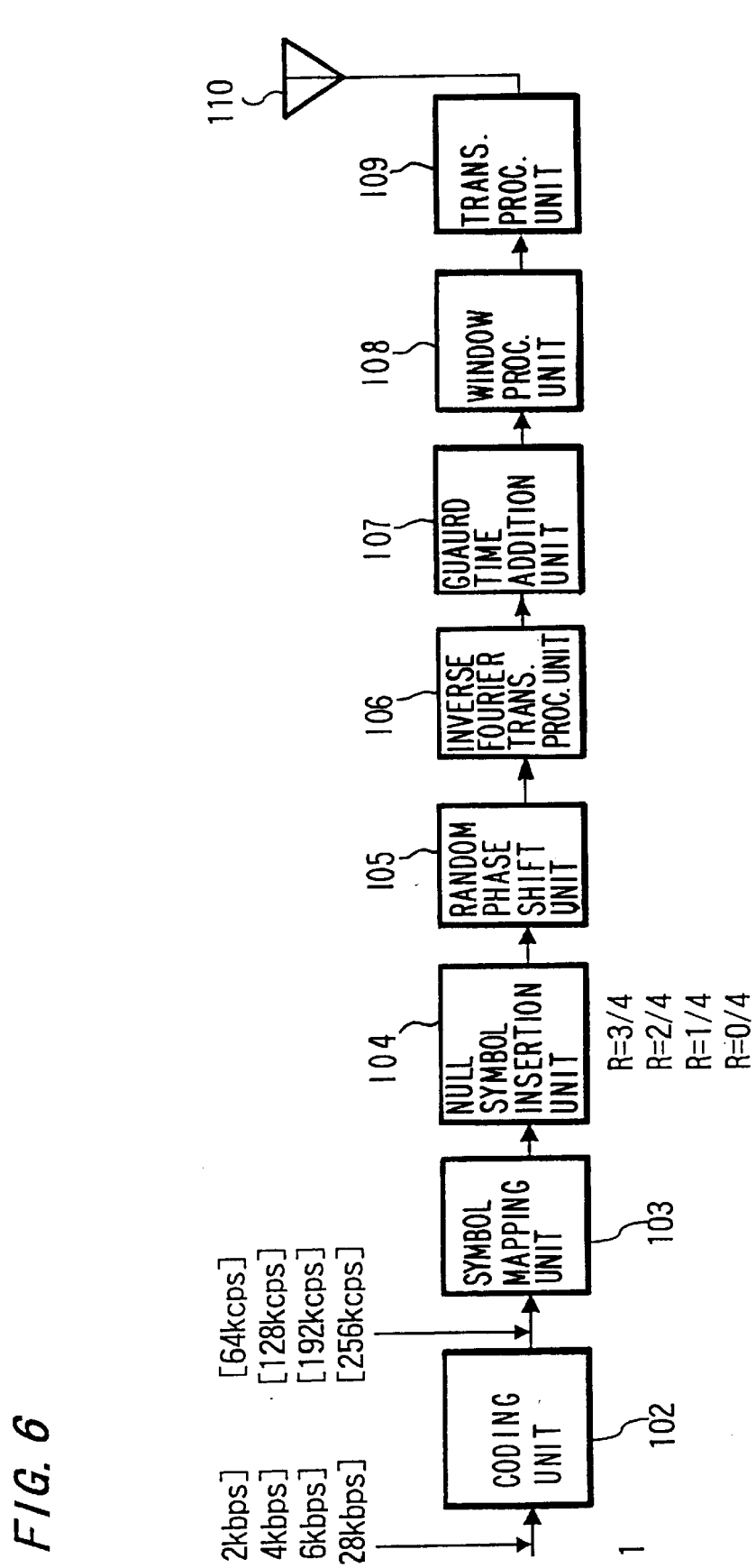
FIG. 6 is a block diagram showing an example of a transmission configuration according to a first embodiment of the present invention.

In the present embodiment, the present invention is applied to a radio telephone system of a cellular scheme. FIG. 6 shows a transmission configuration of the base station side or the terminal device side in the system of the present example. This is adapted to be able to transmit data of rates of four kinds, i.e., 32 kbps, 64 kbps, 96 kbps, and 128 kbps as the transmission data.

Communication is conducted in each of the plurality of set channels using a multi-carrier signal having transmission symbols distributed among a plurality of subcarriers, wherein the transmission symbols of each channel of the plurality of set channels on a frequency axis are arranged at intervals of an $N^{th}$ power of 2, where N is an arbitrary positive number, with respect to a reference frequency interval.

An information bit stream having one of the above described transmission rates obtained at a terminal 101 is subjected to coding processing such as coding and interleaving in a coding unit 102. The information bit stream is thus coded with a predetermined coding rate such as a coding rate of 1/2. Each bit coded in the coding unit 102 is supplied to a symbol mapping unit 103, and mapped to transmission symbols therein. As for mapping processing to the transmission symbols performed here, processing such as QPSK processing, 8-PSK processing, or 16-QAM processing can be applied. Alternatively, differential modulation on the frequency axis or the time axis may be performed in some cases.

The transmission symbols generated in this symbol mapping unit 103 are supplied to a null symbol insertion unit 104. In the null symbol insertion unit 104, there is performed processing for making the symbol rate equal to the maximum transmission rate (here, a rate corresponding to 128 kbps) constantly irrespective of the transmission rate of the original information bit stream by regularly inserting symbols having amplitude (energy) of 0 depending on the transmission rate obtained at that time.

FIGS. 7A–D shows examples of the insertion state of the null symbols. Symbol positions each indicated by a circle mark represent symbol positions of original transmission data. Symbol positions each indicated by a cross mark represent positions of symbols 0 inserted in the null symbol insertion unit 104. For example, in the case where the transmission rate of the information bit stream is 32 kbps, three null symbols are inserted between the original symbols as shown in FIG. 7A. The information bit stream is thus converted to transmission data having a number of symbols corresponding to 128 kbps (i.e., four times). Furthermore, in the case where the transmission rate of the information bit stream is 64 kbps, one null symbol is inserted between the original symbols as shown in FIG. 7B. The information bit stream is thus converted to transmission data having a number of symbols corresponding to 128 kbps (i.e., twice). Furthermore, in the case where the transmission rate of the information bit stream is 96 kbps, one null symbol is inserted every three original symbols as shown in FIG. 7C. The information bit stream is thus converted to transmission data having a number of symbols corresponding to 128 kbps (i.e., 4/3 times). Finally, in the case where the transmission rate of the information bit stream is 128 kbps, null symbols are not inserted and the transmission data remains to have the original number of symbols as shown in FIG. 7D.

Here, an insertion factor R of null symbols in the null symbol insertion unit 104 is defined as $$\text{insertion factor } R = (M-D)/M \tag{1}$$

where M is the maximum transmission rate (here, 128 kbps) in the transmission band, and D is the transmission rate in the pertinent channel.

This processing in the null symbol insertion unit 104 is processing for effecting control so as to increase the symbol rate to $2^N$ times (where N is an arbitrary positive number) by inserting null symbols. In the processing shown in FIG. 7C, i.e., in the case of transmission at the rate of 96 kbps, the value of N does not become an integer. However, this processing is processing using a rule with the null symbol insertion rate R=1/4 based upon the equation [1].

The transmission symbols having the null symbols inserted in the null symbol insertion unit 104 are subjected to scramble processing using random phase shifts (or other scramble processing) in a random phase shift unit 105. The transmission symbols thus subjected to the scramble processing are supplied to an inverse Fourier transform (IFFT) processing unit 106. By computation processing of inverse fast Fourier transform, the symbol stream arranged on the time axis is transformed to a multi-carrier signal having subcarriers arranged on the frequency axis. The signal thus transformed in the inverse Fourier transform processing unit 106 is supplied to a guard time addition unit 107, where a guard time is added thereto. In addition, the signal is multiplied by windowing data for transmission in a windowing processing unit 108 every predetermined unit of the signal. The transmission signal thus multiplied by the windowing data is supplied to a transmission processing unit 109. A high frequency signal is convolved therein, and the transmission signal is converted in frequency to a predetermined frequency band. The transmission signal thus subjected to frequency conversion is radio-transmitted from an antenna 110.

Figure 8:
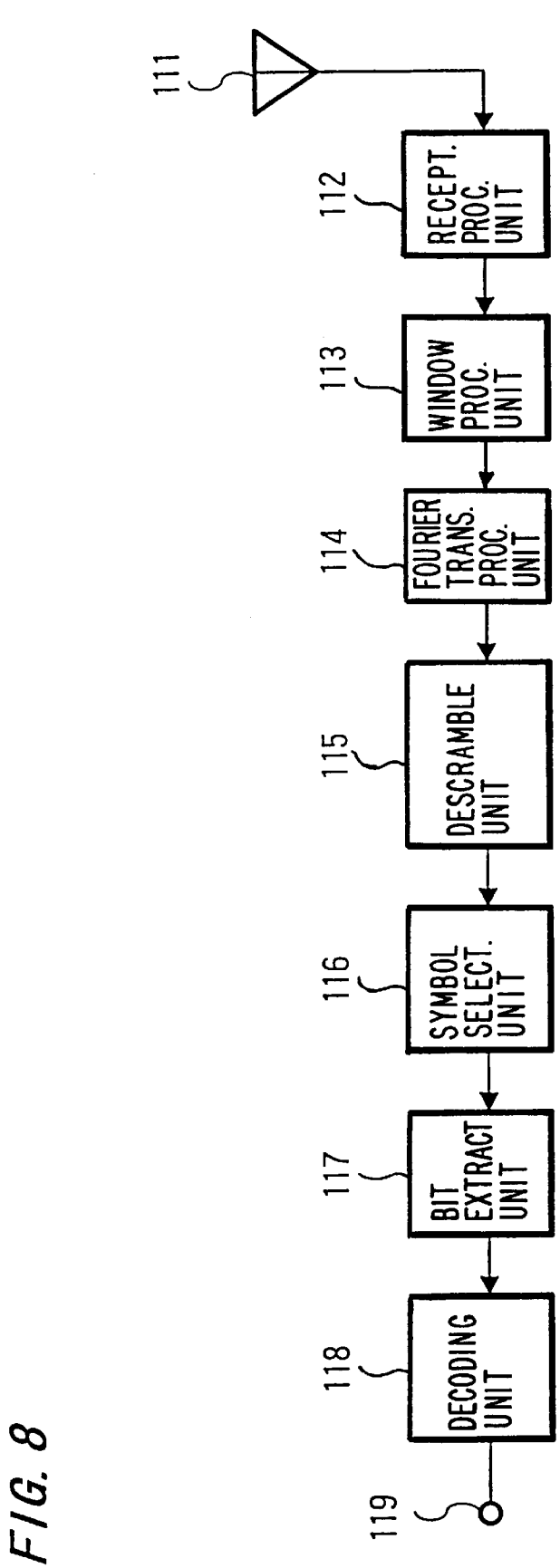
FIG. 8 is a block diagram showing an example of a reception configuration according to the first embodiment of the present invention.

A configuration for receiving the signal radio-transmitted from the above described configuration, in a terminal device or a base station, is shown in FIG. 8. In a reception processing unit 112 connected to an antenna 111, the signal of the predetermined transmission frequency band is received and converted to a baseband signal. The baseband signal thus converted is supplied to a windowing processing unit 113, and the signal is multiplied by a windowing data for reception every predetermined unit of the signal. Thereafter, the signal is supplied to a Fourier transform (FFT) processing unit 114, and the subcarriers arranged on the frequency axis are transformed to a symbol stream arranged on the time axis.

The transformed symbol stream is subjected in a descrambling unit 115 to descramble processing which is inverse to the scramble processing performed at the time of transmission. The descrambled symbol stream is supplied to a symbol selection unit 116. In the symbol selection unit 116, there is performed processing for selecting symbols other than the null symbols inserted in the symbol insertion unit 104 (see FIG. 6) at the time of transmission (i.e., processing for removing the null symbols). The symbol stream with the null symbols removed is supplied to a bit extraction unit 117, and coded bits are extracted therein. The extracted bit data is supplied to a decoding unit 118 and decoded therein. A decoded information bit stream is obtained at a terminal 119.

Figure 7:
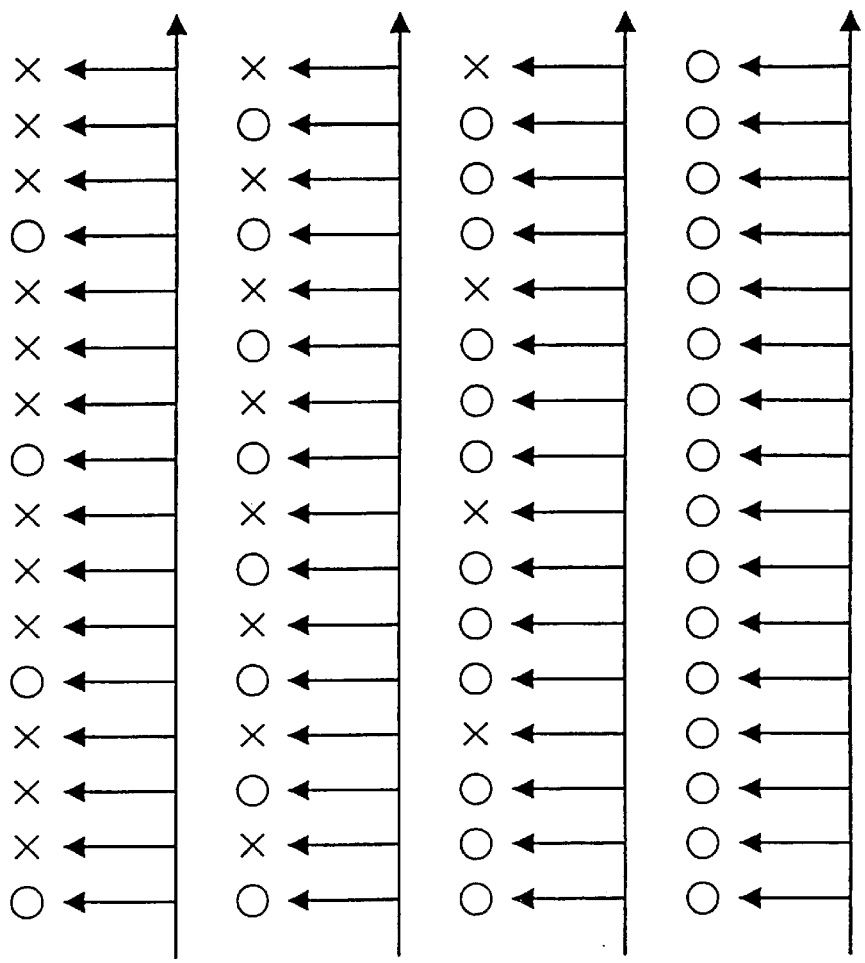
FIGS. 7A–7D are diagrams for description showing examples of an insertion state and an extraction state of null symbols according to the first embodiment of the present invention.

The symbols extracted at the symbol selection unit 116 differ depending on the transmission rate of the transmitted information bit stream. In other words, positions of null symbols each having a zero amplitude inserted at the time of transmission differ depending on the transmission rate, as shown in FIG. 7. In the case of each of the transmission rates, processing for extracting only symbols represented by the circle marks is performed. By performing this processing, data of the transmission rates in the range from 32 kbps to 128 kbps can be transmitted by using the same communication bandwidth.

Figure 9:
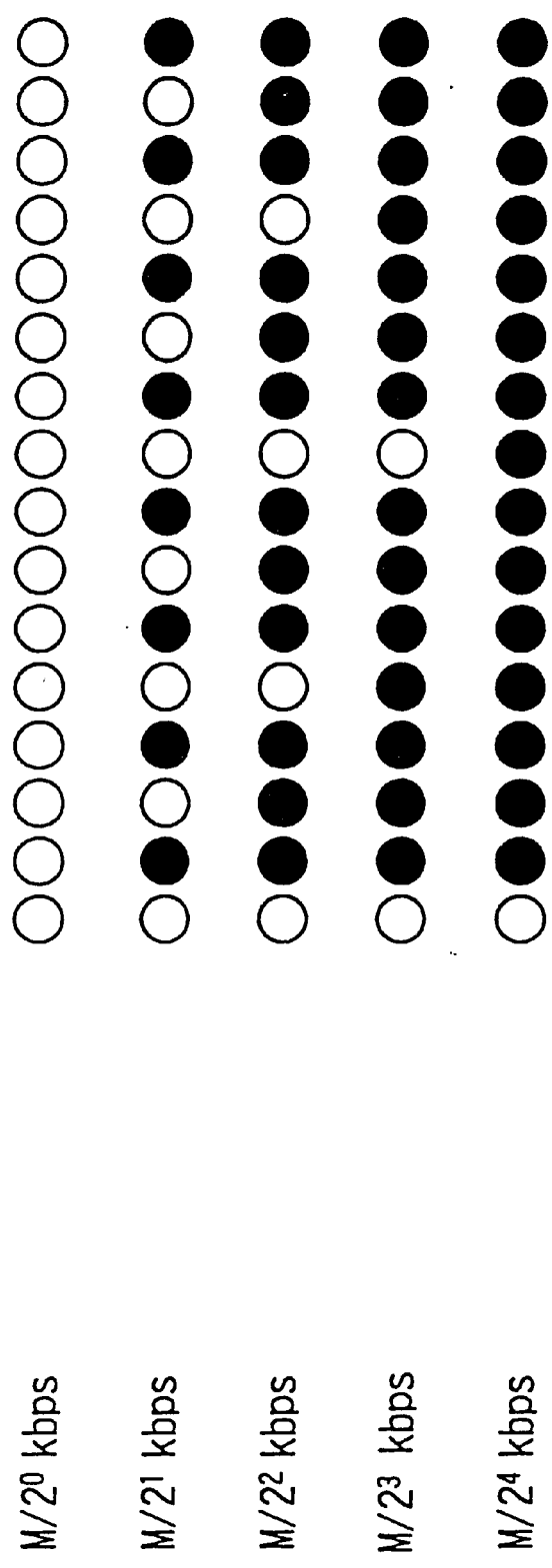
FIG. 9 is a diagram for description showing an example of a symbol arrangement according to the first embodiment of the present invention.

Heretofore, the case where transmission is performed at variable transmission rate in the range of 32 kbps to 128 kbps has been described. By performing similar processing, it is possible to conduct communication of $M/2^N$ kbps in a band allowing communication of maximum bit number Mkbps. On the transmission side in this case, generated symbols and null symbols are inserted according to a pattern shown in FIG. 9. In FIG. 9, symbols represented by white circles are symbols generated by information bits, whereas symbols represented by black circles are null symbols.

By virtue of the communication heretofore described, it becomes possible to perform transmission in the range of low rate transmission to high rate transmission by using the same communication bandwidth. For example, even in a terminal device having a single radio frequency circuit (transmission processing circuit and reception processing circuit), communication of a variable transmission rate will be possible.

Figure 10:
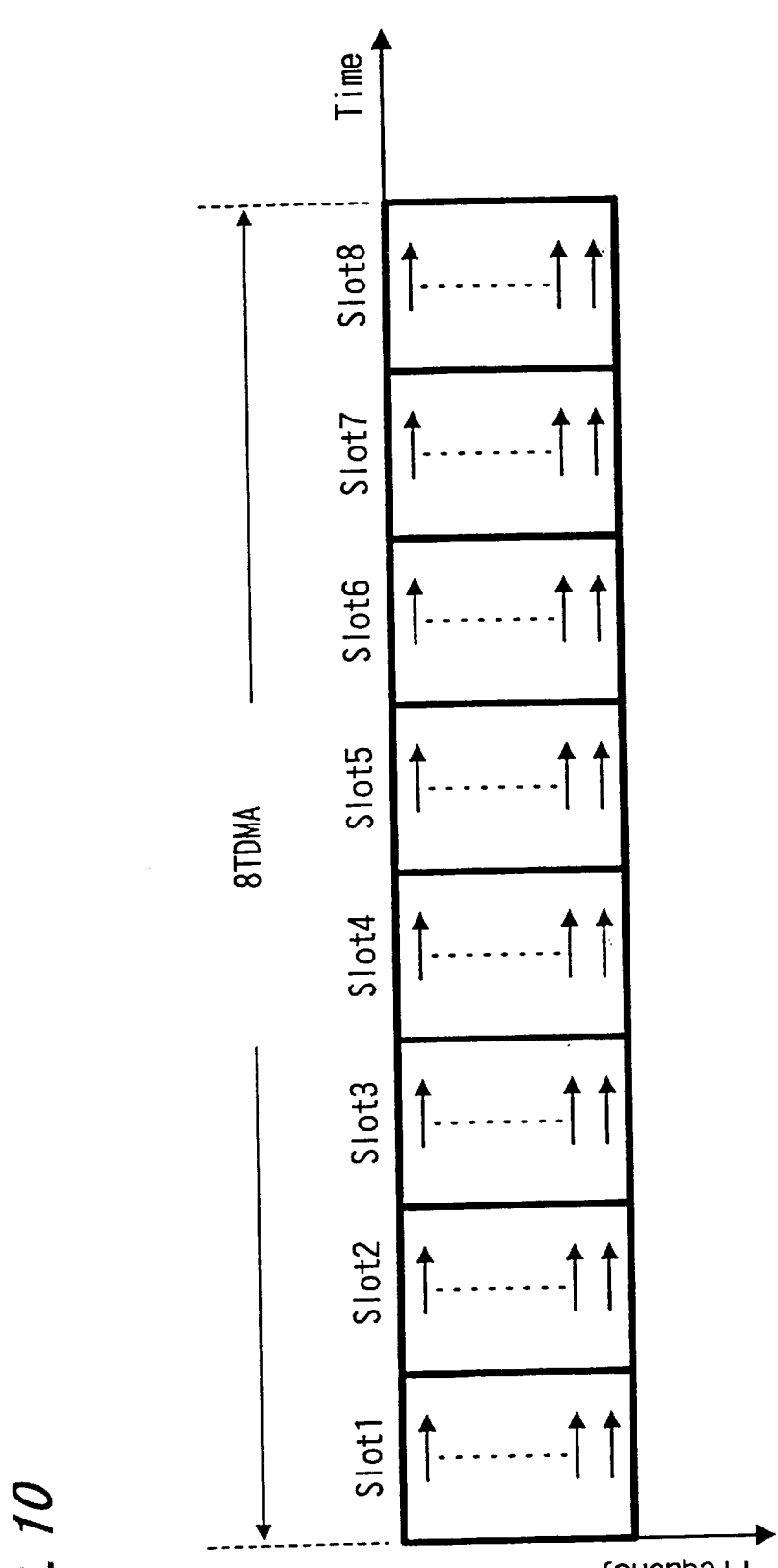
FIG. 10 is a diagram for description showing an example in which processing according to the first embodiment of the present invention is applied to the TDMA scheme.

Additionally, by performing the transmission processing described with reference to the first embodiment in the TDMA structure, it becomes possible to increase the difference between the lowest transmission rate and the highest transmission rate. FIG. 10 is a diagram showing an example of a frame structure in this case. In the case of 8 TDMA structure in which one frame is formed of eight time slots, i.e., slot 1 through slot 8, it is assumed that a band capable of transmitting multi-carrier signals at the rate from 32 kbps (null symbol insertion factor R=3/4) to 128 kbps (null symbol insertion factor R=0/4) by using one slot is set. Then, in communication using only one slot per frame, transmission at the rate in the range of 32 kbps to 128 kbps is performed. In communication using two slots per frame, transmission of the rate up to 256 kbps is performed. When the number of used slots is increased to the maximum value of 8 and the null symbol insertion factor is R=0/4, communication at the transmission rate of 128 kbps×8=1024 kbps becomes possible.

Furthermore, positions in which null symbols have been inserted (subcarriers using null symbols) in the transmission processing described with reference to the first embodiment can be used for communication of other systems. By thus using the subcarriers located in the insertion positions of the null symbols for other communication, multiplexed communication can be conducted efficiently. For example, when transmitting an information bit stream of a rate of 64 kbps in the transmission processing shown in FIG. 6, it is possible to transmit information bit streams of the 64-kbps rate of two systems in one transmission band by conducting communication of the other system in the null symbol insertion positions. Likewise, in the case of the 32-kbps rate, it is possible to transmit information bit streams of the 32-kbps rate of four systems by using one transmission band. Furthermore, it is also possible to perform transmission of the 96-kbps rate and transmission of the 32-kbps rate using one transmission band.

A second embodiment of the present invention will now be described with reference to FIGS. 11 through 13E. In the present embodiment as well, an example in which the present invention is applied to a radio telephone system of the cellular scheme is assumed. In this example, multiplexed transmission is performed from one transmitter. This multiplexed transmission can be applied to the case where transmission signals of a plurality of systems are transmitted simultaneously from, for example, a base station. In this embodiment, the configuration excepting a part for conducting the multiplexed communication performs basically the same processing as that described in the first embodiment, and so the configuration of a receiving system will be omitted.

Figure 11:
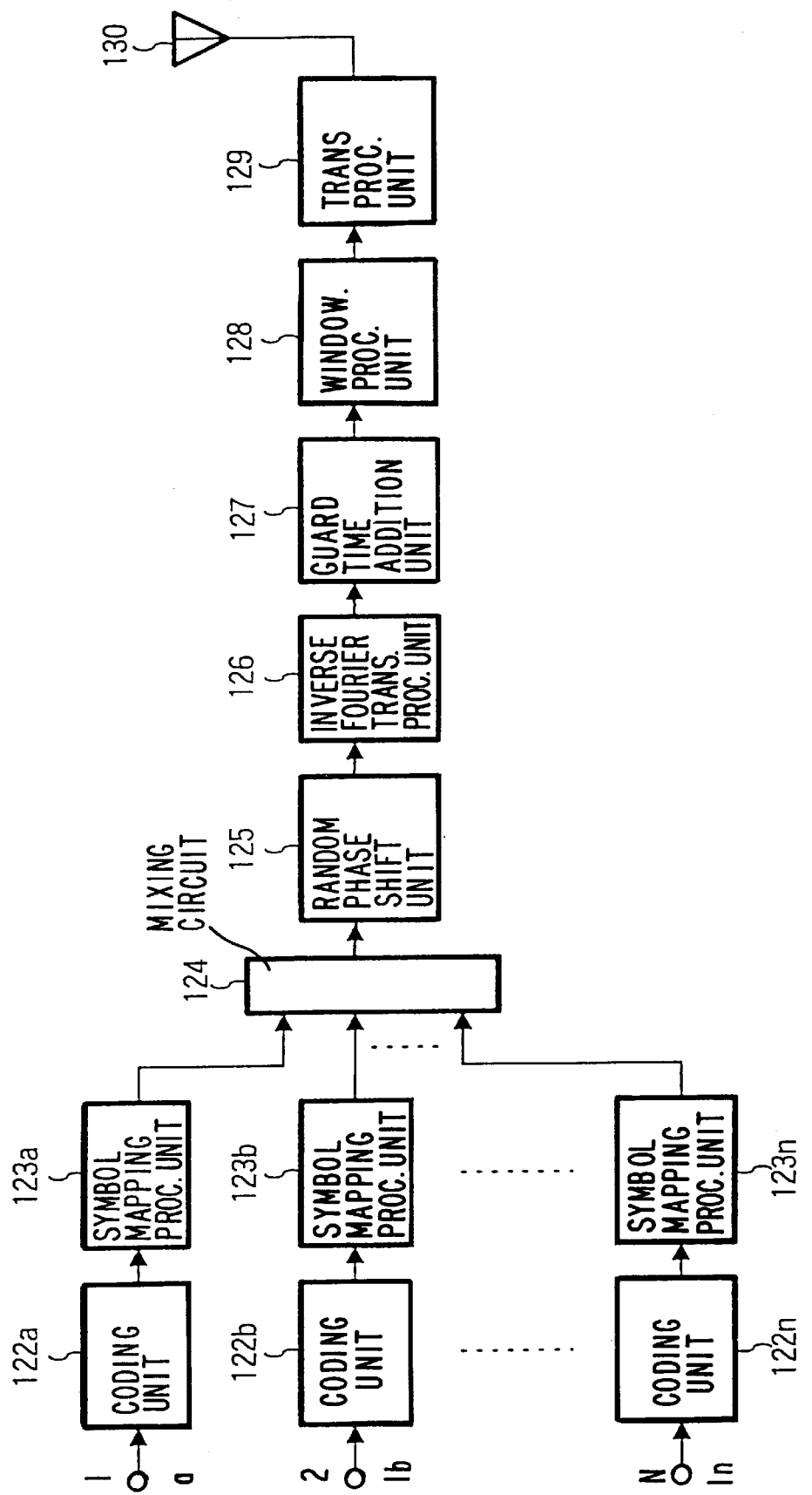
FIG. 11 is a block diagram showing an example of a transmission configuration according to a second embodiment of the present invention.

FIG. 11 is a diagram showing the transmission configuration in the present embodiment. It is now assumed that information bit streams of N channels composed of channel 1, channel 2, . . . , channel N (where N is an arbitrary integer) are obtained at terminals 121*a*, 121*b*, . . . , 121*n*. The information bit streams of respective channels obtained at the terminals 121*a* through 121*n* are bit streams having the same transmission rate, each of which is supplied to different coding units 122*a*, 122*b*, . . . , 122*n* and subjected individually to coding processing such as encoding and interleaving. The bit streams of respective channels encoded in the coding units 122*a* through 122*n* are supplied to separate symbol mapping units 123*a*, 123*b*, 123*n*, respectively and are mapped to transmission symbols separately for respective channels. As the mapping processing to the transmission symbols performed here, processing such as QPSK processing, 8-PSK processing, or 16-QAM processing can be applied. Alternatively, differential modulation on the frequency axis or on the time axis may be conducted in some cases.

The transmission symbols generated in the symbol mapping units 123*a* through 123*n* are supplied to a mixing circuit (multiplexer) 124, and mixed into a symbol stream of one system. FIG. 12 is a diagram briefly showing a concept of processing performed in the mixing circuit 124. Here, symbol streams of, for example, 4 channels composed of channel 1 though channel 4 are converted into a symbol stream of one system. The symbol stream of the channel 1 is obtained at a terminal 124*a* of the mixing circuit 124. The symbol stream of the channel 2 is obtained at a terminal 124*b* of the mixing circuit 124. The symbol stream of the channel 3 is obtained at a terminal 124*c* of the mixing circuit 124. The symbol stream of the channel 4 is obtained at a terminal 124*d* of the mixing circuit 124. At this time, a contact 124*m* of a switch included in the mixing circuit 124 performs processing of periodically selecting the terminals 124*a* through 124*d* in order and outputting a resultant symbol stream.

Figure 13E:
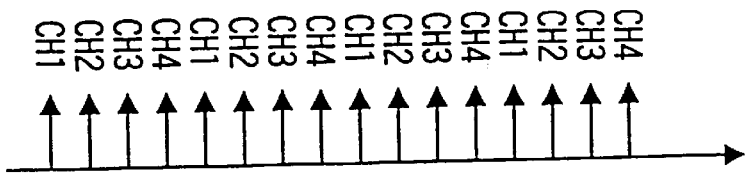

FIGS. 13A–E is a diagram showing an example of this mixing process. For example, when symbol streams of different channels 1, 2, 3 and 4 are obtained in states shown in FIGS. 13A, B, C, and D, the symbols of the respective channels are selected in turn. A mixed stream of one system shown in FIG. 13E is thus obtained. For example, when the stream of each channel is composed symbols of an information bit stream having a rate of 32 kbps, a symbol stream corresponding to an information bit stream having a rate of 128 kbps is obtained. By the way, in the case where sending time of symbols in each channel is not synchronized, synchronizing processing using a buffer memory or the like will be necessary.

Returning to the description of FIG. 11, transmission symbols mixed in the mixing circuit 124 are subjected to scramble processing using random phase shifts (or other scramble processing) in a random phase shift unit 125. The transmission symbols thus subjected to the scramble processing are supplied to an inverse Fourier transform (IFFT) processing unit 126. By computation processing of inverse fast Fourier transform, the symbol stream arranged on the time axis is transformed to a multi-carrier signal having subcarriers arranged on the frequency axis. The signal thus transformed in the inverse Fourier transform processing unit 126 is supplied to a guard time addition unit 127, and a guard time is added thereto. In addition, the signal is multiplied by windowing data for transmission in a windowing processing unit 128 every predetermined unit of the signal. The transmission signal thus multiplied by the windowing data is supplied to a transmission processing unit 129. A high frequency signal is convolved there, and the transmission signal is converted in frequency to a predetermined frequency band. The transmission signal thus subjected to frequency conversion is radio-transmitted from an antenna 130.

On the side for receiving the signal thus radio-transmitted (for example, a terminal device for receiving a signal fed from a base station), a signal of an arbitrary channel can be extracted and processed by performing reception processing in, for example, the configuration of FIG. 8 described with reference to the above first embodiment.

Since the case of multiplexing of four channels has been described, the symbol emergence period of each channel in the multiplexed symbol stream (FIG. 13E) is 4. However, the maximum number of multiplexed channels is not limited to this. The maximum number of multiplexed channels can be set to $2^n$ (where n is a positive integer, i.e., n=1, 2, 3, 4 ... ). In this case, the symbol emergence period of each channel becomes $2^n$ which is the same as the maximum number of multiplexing. In the case where the number of channels used in actual communication is less than the maximum number of multiplexing, null symbols (symbols having an amplitude of 0) described with reference to the first embodiment may sufficiently be inserted as symbols of unused channels.

Figure 15:
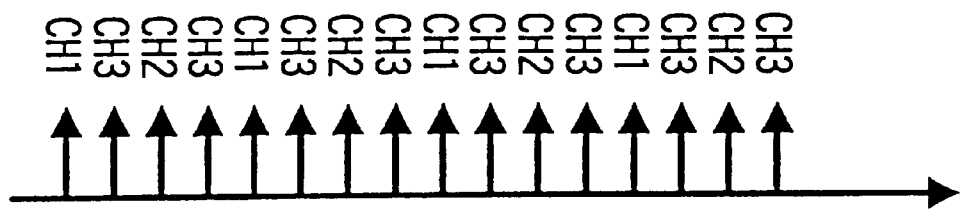
FIG. 15 is a diagram showing an example of a mixed state according to the third embodiment of the present invention.

A third embodiment of the present invention will now be described referring to FIGS. 14 and 15. In the present embodiment as well, an example in which the present invention is applied to a radio telephone system of the cellular scheme is assumed. In this example also, multiplexed transmission is performed from one transmitter in the same way as the second embodiment. Components corresponding to those of the second embodiment are denoted by like characters, and detailed description thereof will be omitted.

In the case of the present embodiment, transmission rates of respective channels are different. FIG. 14 is a diagram showing the transmission configuration in the present embodiment. It is now assumed that information bit streams of three channels in total composed of channel 1, channel 2, and channel 3 are obtained at terminals 131a, 131b, and 131c. As for transmission rates of respective channels, it is assumed that, for example, each of the channel 1 and channel 2 has a transmission rate of 32 kbps and the channel 3 has a transmission rate of 64 kbps. The information bit streams of respective channels obtained at the terminals 131a through 131c are supplied respectively to different coding units 132a, 132b and 132c, and subjected to coding processing such as encoding and interleaving individually. The bit streams of the channel 1 and the channel 2 encoded in the coding units 132a and 132b are each supplied to symbol mapping units 133a and 133b for respective channels, and mapped to transmission symbols separately for respective channels. Furthermore, the bit stream of the channel 3 is bisected into bit streams of two systems. The bit stream of one system is supplied to a symbol mapping unit 133c, whereas the bit stream of the other system is supplied to a symbol mapping unit 133d. The bit streams are thus mapped to respective transmission symbols separately.

The transmission symbols mapped in the symbol mapping units 133a through 133d are supplied to a mixing circuit 134 and multiplexed into one system. FIG. 15 shows an example of a multiplexed state obtained here. The symbol stream of the channel 3 divided into two systems are periodically arranged at the same intervals. Between them, the symbol stream of the channel 1 and the symbol stream of the channel 2 are arranged periodically. In other words, the arrangement of, for example, the channel 1, channel 3, channel 2, and channel 3 is repeatedly set.

This multiplexed symbol stream is subjected to scramble processing using random phase shifts (or other scramble processing) in a random phase shift unit 125. The transmission symbols thus subjected to the scramble processing are supplied to an inverse Fourier transform (IFFT) processing unit 126. By computation processing of inverse fast Fourier transform, the symbol stream arranged on the time axis is transformed to a multi-carrier signal having subcarriers arranged on the frequency axis. The signal thus transformed in the inverse Fourier transform processing unit 126 is supplied to a guard time addition unit 127, and a guard time is added thereto. In addition, every predetermined unit of the signal is multiplied by windowing data for transmission in a windowing processing unit 128. The transmission signal thus multiplied by the windowing data is supplied to a transmission processing unit 129. A high frequency signal is convolved therein, and the transmission signal is converted in frequency to a predetermined frequency band. The transmission signal thus subjected to frequency conversion is radio-transmitted from an antenna 130.

On the side for receiving the signal thus radio-transmitted (for example, a terminal device for receiving a signal fed from a base station), a signal of an arbitrary channel can be extracted and processed by performing reception processing in, for example, the configuration of FIG. 8 described with reference to the above first embodiment. In other words, when extracting a signal of channel 1 or channel 2 from transmitted signals multiplexed in a state shown in FIG. 15, the signal of that channel can be received by extracting symbols every four periods. when extracting a signal of channel 3, the signal of that channel can be received by extracting symbols every two periods.

The example in which communication is conducted by using a band capable of transmitting up to 128 kbps when the transmission rates of 32 kbps and 64 kbps are both present has been described. However, the present embodiment is not restricted to this. In other words, the transmission rate D [kbps] of each channel can be basically set as represented by the following equation.

$$\text{Transmission rate } D=M/2^N [\text{kbps}] \quad [2]$$

In this equation, N is a positive integer as represented by N=1, 2, 3, ... , and M is the maximum transmission rate in the pertinent band.

Furthermore, in the same way as 96 kbps described earlier with the first embodiment, a rate having a value located between rates set by the equation [2] may be set.

A fourth embodiment of the present invention will now be described by referring to FIGS. 16 through 21. In the present embodiment as well, an example in which the present invention is applied to a radio telephone system of the cellular scheme is assumed. In this example, multiplexed transmission is performed from a plurality of transmitters. For example, this corresponds to a case where multiplexed transmission is performed simultaneously from a plurality of terminal devices and reception is performed collectively by a base station.

Figure 16:
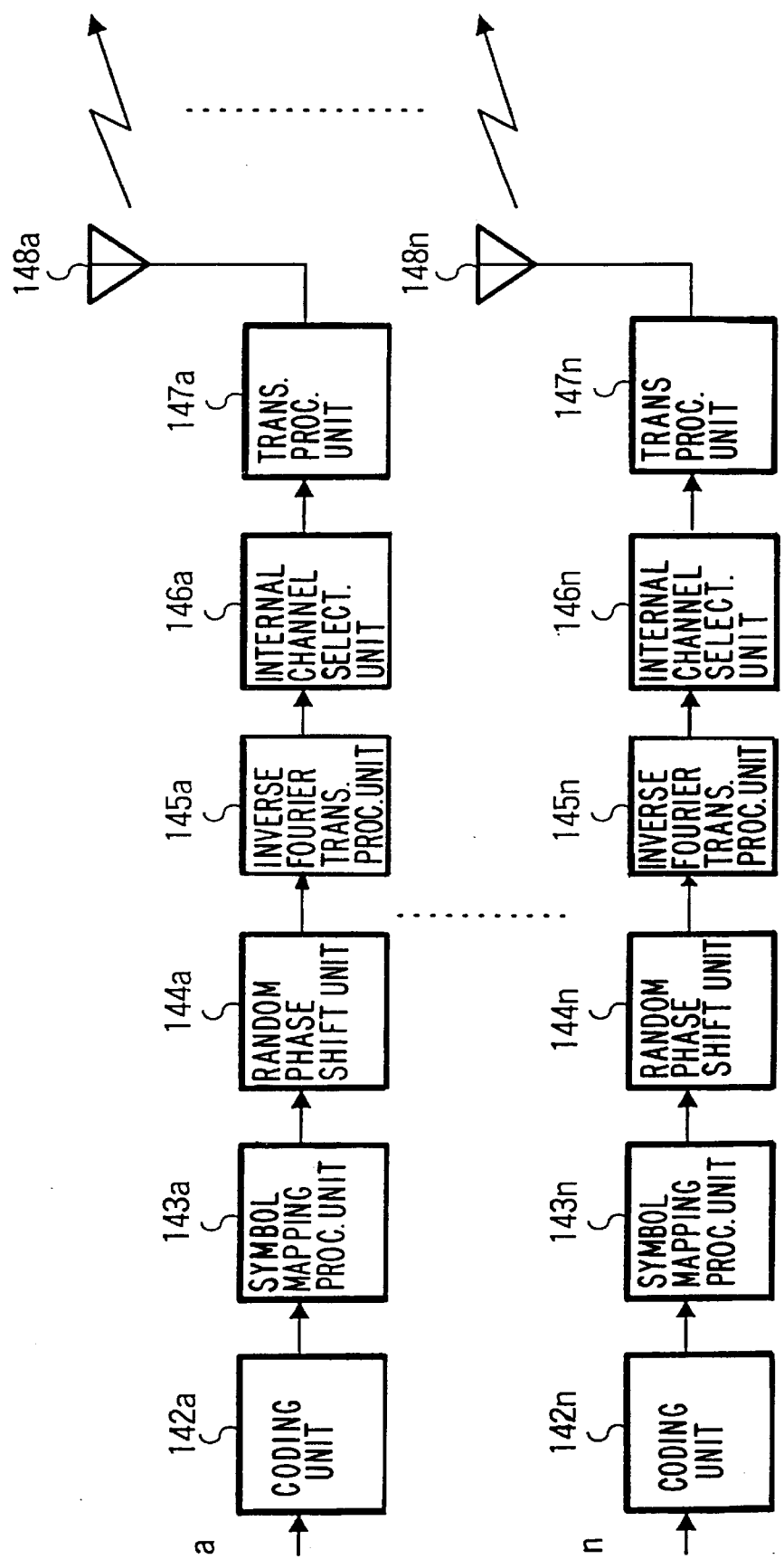
FIG. 16 is a block diagram showing an example of a transmission configuration according to a fourth embodiment of the present invention.

FIG. 16 is a diagram showing the transmission configuration in the present embodiment. It is now assumed that information bit streams of channel 1 through channel N (where N is an arbitrary integer) are individually obtained at terminals 141a through 141n of respectively different transmitters. The transmitters basically have the same configuration. The configuration of a transmitter for processing the signal of the channel 1 will be described. The information bit stream obtained at the terminal 141a is subjected to coding processing, such as encoding and interleaving in a coding unit 142a. Each of the bits encoded in the coding unit 142a is supplied to a symbol mapping unit 143a and mapped to transmission symbols.

The transmission symbols generated by the symbol mapping unit 143a are subjected to scramble processing using random phase shifts (or other scramble processing) in a random phase shift unit 144a. The transmission symbols thus subjected to the scramble processing are supplied to an inverse Fourier transform (IFFT) processing unit 145a. By computation processing of inverse fast Fourier transform, the symbol stream arranged on the time axis is transformed to a multi-carrier signal having subcarriers arranged on the frequency axis. The signal thus transformed in the inverse Fourier transform processing unit 145a is subjected to internal channel selection processing in an internal channel selection unit 146a. The multi-carrier signal subjected to the internal channel selection processing is supplied to a transmission processing unit 147a. A high frequency is convolved there, and the transmission signal is converted in frequency to a predetermined frequency band. The transmission signal thus subjected to frequency conversion is radio-transmitted from an antenna 148a.

The configuration of the internal channel selection unit 146a is shown in FIG. 17. A signal provided from a preceding circuit to a terminal 151 is supplied to a symbol repetition unit 152 and subjected to symbol repetition processing as many times as a number depending upon the transmission rate at that time. For example, if it is now assumed that the maximum transmission rate in one transmission band is 128 kbps, the subcarrier interval of the radio-transmitted multi-carrier signal on the transmission path is 4 kHz, and the transmission rate in one channel is 32 kbps. At this moment, processing for transforming to a multi-carrier signal having a subcarrier interval of 16 kHz is performed in the preceding inverse Fourier transform processing unit 145a.

In the symbol repetition unit 152, processing for repeating a symbol component of this signal four times is performed, and the multi-carrier signal having a subcarrier interval of 16 kHz is converted to a signal having an interval of 4 kHz. For example, as shown in FIG. 17, a waveform indicated at an input portion of the symbol repetition unit 152 is converted in this symbol repetition unit to-a waveform equivalent to that obtained by repeating the waveform indicated at the input portion four times. By repeating the symbol stream subjected to inverse Fourier transform the number of times multiplexing occurs, there is obtained an effect equivalent to that obtained by inserting null symbols in subcarriers which are not used by pertinent channels.

The symbol repeated in the symbol repetition unit 152 is multiplied in a multiplier 153 by an offset frequency outputted from an offset frequency generator 154. By this multiplication, a phase revolution corresponding to a frequency offset of the pertinent channel is caused in each symbol. By the way, in a case where the frequency offset of the pertinent channel is 0 Hz, multiplication with a constant is performed. In other words, the symbol sequence multiplied in this multiplier 153 determines a channel to which the subcarrier to be used is assigned. The signal multiplied by the offset frequency is supplied to a windowing processing unit 155, and multiplied by windowing data for transmission in every predetermined unit of the signal. A resultant signal is supplied to the transmission processing unit 147a via a terminal 156.

A state example of signals subjected to transmission processing in each channel is shown in FIGS. 18A–E. The maximum transmission rate in one transmission band is 128 kbps. Data having this transmission rate of 128 kbps is transmitted using a multi-carrier signal having subcarriers located at intervals of 4 kHz. In such a case, four transmitters uses one transmission band. Data each having a transmission rate of 32 kbps supplied from the four transmitters are multiplexed and transmitted by using one transmission band.

FIGS. 18A, B, C, and D show transmission signals of channel 1, channel 2, channel 3, and channel 4 transmitted from each transmitter, respectively. Communication is conducted in each of the plurality of set channels using a multi-carrier signal having transmission symbols distributed among a plurality of subcarriers, wherein the transmission symbols of each channel of the plurality of set channels on a frequency axis are arranged at intervals of an $N^{th}$ power of 2, where N is an arbitrary positive number, with respect to a reference frequency interval. Frequency positions where subcarriers exist in each channel are set as follows. For the channel 1, subcarriers are located at intervals of 16 kHz beginning from a reference frequency fc as shown in FIG. 18A. For the channel 2, subcarriers are located at intervals of 16 kHz beginning from frequency position obtained by a shift of 4 kHz from the reference frequency fc as shown in FIG. 18B. For the channel 3, subcarriers are located at intervals of 16 kHz beginning from a frequency position obtained by a shift of 8 kHz from the reference frequency fc as shown in FIG. 18C. For the channel 4, subcarriers are located at intervals of 16 kHz beginning from a frequency position obtained by a shift of 12 kHz from the reference frequency fc as shown in FIG. 18D.

By radio-transmitting signals of these channels, subcarriers are arranged at intervals of 4 kHz on the radio transmission path as shown in FIG. 18E. Signals of four channels are thus multiplexed and transmitted in one transmission band. In this case, fast inverse Fourier transform processing performed in the inverse Fourier transform processing unit included in each transmitter may be only processing for transforming a signal having a transmission rate of 32 kbps handled by that channel to subcarriers having a width of 16 kHz. Thus the processing amount in the inverse Fourier transform processing unit can be significantly reduced as compared with the processing amount required in the case of the subcarrier interval in that system.

The example in which communication of signals having a transmission rate of 32 kbps is conducted has been described herein. For example, when communicating signals having a transmission rate of 64 kbps in the same transmission band, however, it will be sufficient to perform operation by the inverse Fourier transform processing unit which has a scale matching with the communication at that rate (in other words, twice as many samples as those at the time of communication of 32 kbps are outputted) and repeat twice in symbol repetition performed in the internal channel selection unit. No matter what value the transmission rate may have, it is possible to generate the transmission signal by performing similar processing. In this case, the processing circuit included in each transmitter (terminal device) need only have an inverse Fourier transform processing circuit which has-capability corresponding to the transmission rate for performing transmission in that device. It is not necessary for every terminal device to have capability of generating a multi-carrier signal having prescribed subcarrier intervals in the prepared transmission band. Thus, the configuration of each terminal device can be simplified.

Furthermore, by simultaneously performing, for example, the null symbol insertion processing as described above with reference to the first embodiment to cope with a transmission rate change, this allows a case of a lower transmission rate to be coped with.

An example of a configuration for receiving the signals thus multiplexed, for example, collectively in a base station is shown in FIG. 19. A reception processing unit 162 connected to an antenna 161 receives a signal of a predetermined transmission frequency band and converts it to a baseband signal. The baseband signal thus converted is supplied to a windowing processing unit 163, and every predetermined unit of the signal is multiplied by a windowing data for reception. Thereafter, the signal is supplied to a Fourier transform (FFT) processing unit 164, where the subcarriers arranged on the frequency axis are transformed to a symbol stream arranged on the time axis. The transform processing performed here is processing for transforming all subcarriers arranged in the received transmission band.

The transformed symbol stream is subjected in a random phase shift unit 165 to descramble processing which is inverse to the scramble processing performed during transmission. The descrambled symbol stream is subjected in a separation circuit (demultiplexer) 166 to processing for separating symbols multiplexed to a single transmission band into respective. channels. Symbol streams separated into respective channels are supplied to bit extraction units 167a, 167b, . . . , 167n for respective channels, and subjected to bit extraction processing individually for respective channels to derive received bit streams. Resultant received bit streams are supplied to decoding units 168a, 168b, . . . , 168n for respective channels, and decoded individually for respective channels. Information bit streams of respective channels are thus obtained at terminals 169a, 169b, . . . , 169n of respective channels.

Figure 20:
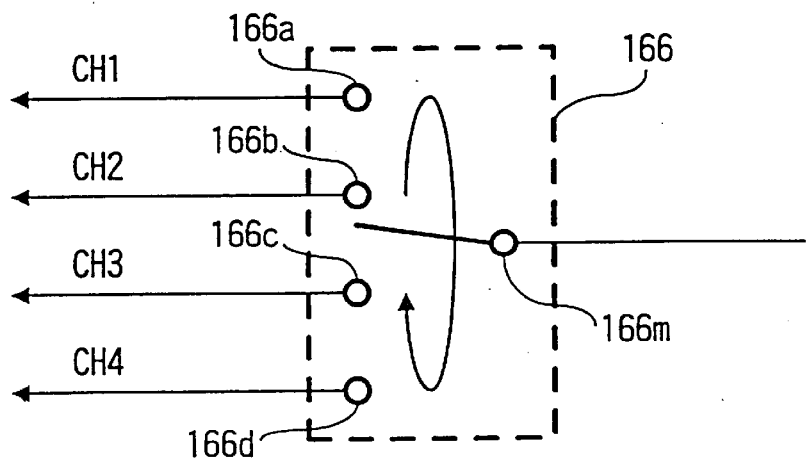
FIG. 20 is a configuration diagram showing an example of a separation circuit according to the fourth embodiment of the present invention.

FIG. 20 is a diagram briefly showing a concept of processing by the separation circuit 166. Here, symbol streams of, for example, four channels composed of channel 1 through channel 4 multiplexed into a symbol stream of one system are separated. Processing for switching so as to supply multiplexed symbol streams obtained at a switch contact 166m included in the separation circuit 166 to four terminals 166a through 166d in order symbol by symbol is performed periodically. By virtue of such switching, the symbol stream of the channel 1 is obtained at the terminal 166a. The symbol stream of the channel 2 is obtained at the terminal 166b. The symbol stream of the channel 3 is obtained at the terminal 166c. The symbol stream of the channel 4 is obtained at the terminal 166d.

Figure 21A:
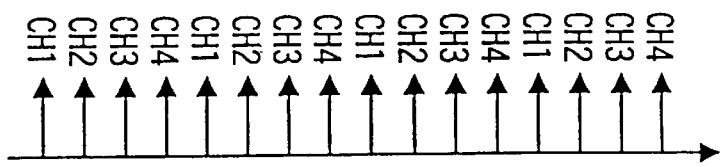
FIGS. 21A–21E are diagrams showing examples of separated state according to the fourth embodiment of the present invention.
Figure 21B:
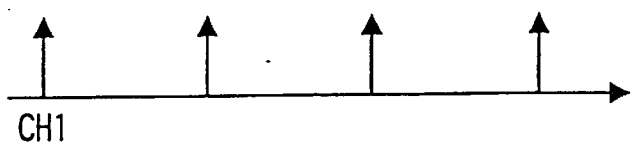
Figure 21C:
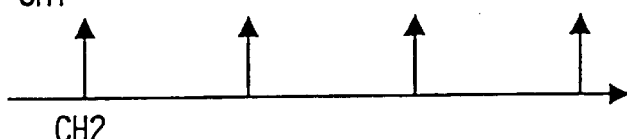
Figure 21D:
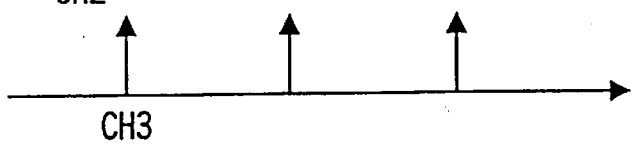
Figure 21E:
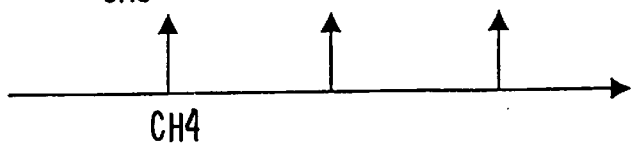

FIGS. 21A–E is a diagram showing an example of the thus separated state. For example, a signal shown in FIG. 21A is a symbol stream obtained by receiving the signal of one transmission band containing multiplexed signals of four channels. In symbols arranged at fixed time intervals, there is a mixture of symbols of the four channels. By changing over the switch contact 166m included in the separation circuit 166 in order symbol by symbol, as shown in FIG. 20, symbols of respective channels are separated and outputted.

By thus configuring the receiver, signals of a plurality of channels multiplexed into one transmission band can be received collectively.

A fifth embodiment of the present invention will now be described by referring to FIGS. 22 through 26. In the present embodiment as well, an example in which the present invention is applied to a radio telephone system of the cellular scheme is assumed. In this example, an arbitrary channel included in signals multiplexed and transmitted in one transmission band is received by the processing of embodiments heretofore described. It corresponds to, for example, the case where an arbitrary channel is received by a terminal device out of signals simultaneously multiplexed and transmitted from a base station.

First of all, a signal received in the present example will be described below. It is now assumed that four channels each having a rate of 32 kbps are multiplexed in one transmission band having a bandwidth capable of transmission at a rate of 128 kbps at maximum, and the subcarrier interval on the transmission path is 4 kHz (i.e., the modulation time of one symbol is 250 $\mu$s=1/4 kHz).

Figure 22:
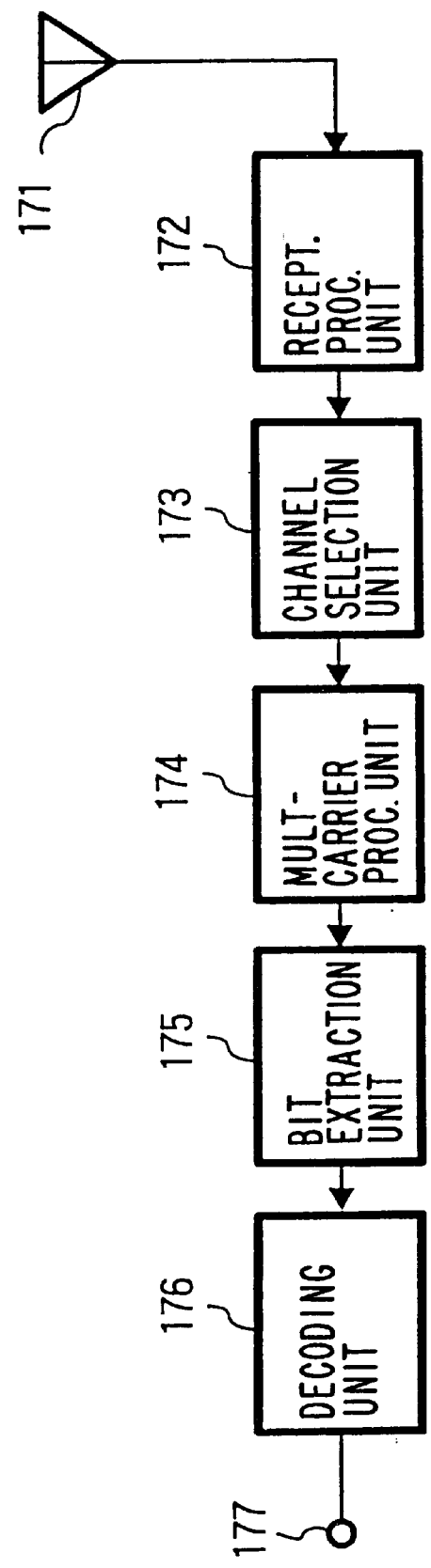
FIG. 22 is a block diagram showing an example of a reception configuration according to a fifth embodiment of the present invention.

FIG. 22 is a diagram showing the reception configuration in the present embodiment. A reception processing unit 172 connected to an antenna 171 receives a signal of a predetermined transmission frequency band and converts it to a baseband signal. From the baseband signal obtained by the conversion, a desired channel is selected. Thereafter, the received signal of the selected channel is supplied to a multi-carrier processing unit 174, where subcarriers arranged on the frequency axis are transformed to a symbol stream arranged on the time axis using Fourier transform processing and so on. By the way, other processings, required for multi-carrier processing such as the windowing processing and the random phase shift are also executed in this multi-carrier processing unit 174.

The transformed symbol stream is supplied to a bit extraction unit 175, and subjected to extraction of coded bits therein. The extracted bit data is supplied to a decoding unit 176 and decoded therein. A decoded information bit stream is obtained at a terminal 177.

Figure 23:
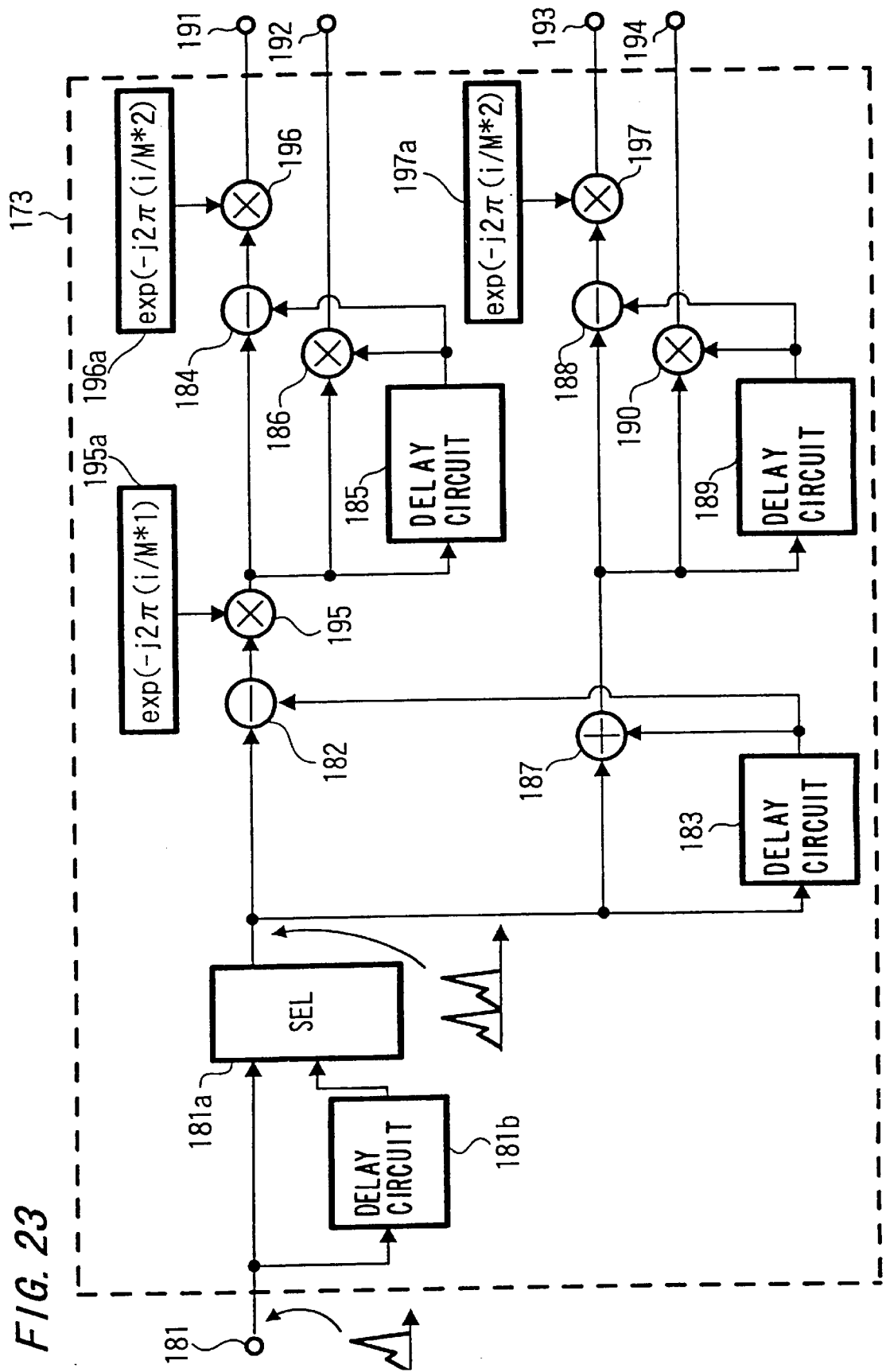
FIG. 23 is a configuration diagram showing an example of a channel selection unit according to the fifth embodiment of the present invention.

FIG. 23 is a diagram showing a configuration example of the channel selection unit 173. As the baseband signal supplied from the preceding reception processing unit to a terminal 181, a signal having subcarriers arranged at 4 kHz intervals on the frequency axis is inputted for 250 $\mu$s. The signal obtained at this terminal 181 is supplied directly to a selector 181a and also delayed by a delay circuit 181b, the delayed signal being supplied to the selector 181a. By selection in the selector 181a, processing for repeating signal symbols is executed.

The output of this selector 181a is supplied to a subtracter 182. At the same time, the signal delayed in a delay circuit 183 by a time equivalent to $\frac{1}{2}^1$ of the modulation time of one symbol (i.e., 125 $\mu$s in this case) is also supplied to the subtracter 182. Thus, a difference between those signals is extracted. The difference signal outputted by the subtracter 182 is supplied to a multiplier 195, and multiplied therein by a correction signal supplied from an offset frequency correction signal generator 195a.

The signal multiplied by the offset frequency in the multiplier 195 is supplied directly to a subtracter 184. At the same time, the signal delayed in a delay circuit 185 by a time equivalent to ¼ (=½$^2$) of the modulation time of one symbol (i.e., 62.5 μs in this case) is also supplied to the subtracter 184. Thus, a difference between those signals is extracted. The difference signal outputted by the subtracter 184 is obtained at a terminal 191 via a multiplier 196. Furthermore, the output signal of the multiplier 195 is supplied directly to an adder 186. At the same time, the signal delayed by a delay circuit 185 is also supplied to the adder 186. Thus, a sum signal of those signals is obtained at a terminal 192.

Moreover, the signal obtained at the terminal 181 and subjected to the symbol repetition processing in the selector 181a and the delay circuit 181b is supplied to an adder 187. At the same time, the signal delayed by a delay circuit 183 is also supplied to the adder 187. A sum signal of those signals is thus obtained. This sum signal is further supplied directly to a subtracter 188. At the same time, the signal delayed in a delay circuit 188 by a time equivalent to ¼ (=½$^2$) of the modulation time of one symbol (i.e., 62.5 μs in this case) is also supplied to the subtracter 188. Thus, a difference between those signals is extracted. The difference signal is obtained at a terminal 193 via a multiplier 197. Furthermore, the output signal of the adder 187 is supplied directly to an adder 190. At the same time, the signal delayed by a delay circuit 189 is also supplied to the adder 190. Thus, a sum signal of those signals is obtained at a terminal 194.

In the multipliers 195, 196, and 197, correction signals supplied from offset frequency correction signal generators 195a, 196a, and 197a are multiplied, respectively. The correction processing of the offset frequency will be described later.

Figure 24A:
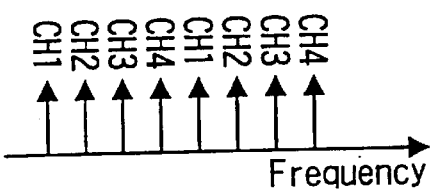
Figure 24B:
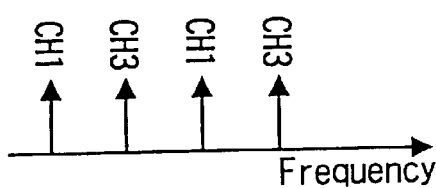

The processing state in the channel selection unit 173 having such a configuration will now be described by referring to FIGS. 24A–G. As the signal supplied to the terminal 181, a signal having subcarriers of channels 1 through 4 arranged at 4 kHz intervals in order as shown in FIG. 24A is inputted for 250 μs. This signal is divided into a former half of 125 μs and a latter half of 125 μs. A difference between them and a sum of them are generated in the subtracter 182 and the adder 187, respectively. From the output of the adder 187, the number of subcarriers is reduced to ½$^1$ and only odd-numbered subcarriers of channel 1 and channel 3 are included as shown in FIG. 24B. From the output of the adder 187, a difference between the output and its delayed signal is generated in the subtracter 188 and a sum of the output and its delayed signal is generated in the adder 190. In the sum signal from the adder 190, only subcarriers of the signal of the channel 1 are included as shown in FIG. 24C. In the difference signal from the subtracter 188, only subcarriers of the signal of the channel 3 are included as shown in FIG. 24D.

Figure 24E:
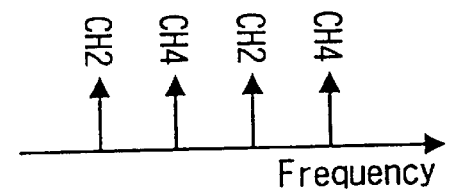

Furthermore, as for the output of the subtracter 182, the number of subcarriers is reduced to half as compared with the original signal and only even-numbered subcarriers of channel 2 and channel 4 are included as shown in FIG. 24E. From the output of the subtracter 182, a sum of the output and its delayed signal is generated in the adder 186 and a difference between the output and its delayed signal is generated in the subtracter 184. In the sum signal from the adder 186, only subcarriers of the signal of the channel 2 are included as shown in FIG. 24F. In the difference signal from the subtracter 184, only subcarriers of the signal of the channel 4 are included as shown in FIG. 24G.

The signals thus obtained at the terminals 191, 192, 193 and 194 are subjected to FFT processing (fast Fourier transform processing) and subcarrier extraction in a subsequent stage. As shown in FIGS. 24D, F and G, however, an offset frequency is convolved in each of the signals of the channels 2 through 4. Specifically, assuming that the subcarrier interval of the multiplexed signals is fs [Hz], an offset frequency of fs [Hz] exists in the channel 2; an offset frequency of 2fs [Hz] exists in the channel 3; and an offset frequency of 3fs [Hz] exists in the channel 4. In order to remove these offsets, therefore, multiplication by a sine wave having a minus offset frequency is performed in the multipliers 195, 196 and 197, whose output signals are supplied to the terminals 191, 192, 193 and 194. To be specific, the channel 2 is multiplied by a signal of −fs [Hz], the channel 3 being multiplied by a signal of −2fs [Hz], and the channel 4 being multiplied by a signal of −3fs [Hz] to obtain outputs.

This processing is performed for the channel 2 (output of the terminal 192) by generating a signal of $\exp(-j2\pi(i/M \times 1))$ in the correction signal generator 195a and multiplying this signal in the multiplier 195. Furthermore, this processing is performed for the channel 3 (output of the terminal 193) by generating a signal of $\exp(-j2\pi(i/M \times 2))$ in the correction signal generator 197a and multiplying this signal in the multiplier 197. Furthermore, this processing is performed for the channel 4 (output of the terminal 191) by generating a signal of $\exp(-j2\pi(i/M \times 1))$ in the correction signal generator 195a, multiplying this signal in the multiplier 195, further generating a signal of $\exp(-j2\pi(i/M \times 2))$ in the correction signal generator 196a, and multiplying this signal in the multiplier 196. M indicated as the correction signal denotes the number of symbols inputted to the channel selection means 173 during 250 μsec, and i is a subscript showing the turn of the inputted symbol. When the signals with offset frequencies thus removed which are obtained at the terminals 191, 192, 193 and 194 are viewed on the frequency axis, offset frequencies have been wiped out as shown on the right sides of FIGS. 24C, D, F and G. Subcarriers of any channel can be extracted by the same FFT circuit.

In this way, subcarriers of respective channels are separated in the channel selection unit 173. In the channel selection circuit 173 and subsequent circuits, it is possible to obtain the information bit stream of the pertinent channel by processing only the subcarriers of a channel to be received.

By the way, the channel selection unit shown in FIG. 23 is formed so as to separate all signals of four multiplexed channels. In the case where the signal of only one certain channel is necessary, however, for example, a channel selection unit 173' shown in FIG. 25 may be used. In other words, a received signal (baseband signal) obtained at a terminal 201 is subjected to symbol repetition processing by using a selector 201a and a delay circuit 201b, the signal then being supplied to a computation unit 202. At the same time, the signal delayed in a delay circuit 203 by a time equivalent to ½$^1$ of one modulation time is also supplied to the computation unit 202. The computation unit 202 performs computation processing of either addition processing or subtraction processing under the control of a control unit 207. The output of the computation unit 202 is multiplied by a sine wave in a multiplier 208 to remove the offset frequency, and then supplied directly to a computation unit 204. At the same time, the signal delayed in a delay circuit 205 by a time equivalent to ¼ (=½$^2$) of one modulation time is also supplied to the computation unit 204. The computation unit 202 performs computation processing of either addition processing or subtraction processing under the control of a control unit 207. The output of the computation unit 204 is multiplied by a sine wave in a multiplier 209 to remove the offset frequency, and then supplied to a terminal 206, from which it is supplied to subsequent circuits. By the way, the offset frequency corrected in the multipliers 208 and 209 is determined under the control of the control unit 207. Owing to such a configuration, it is possible to realize the same state as the selection processing state of each channel in the channel selection unit 173 shown in FIG. 23, by the control on the addition processing or subtraction processing in the computation unit 202 or the computation unit 204 performed by the control unit 207. It is thus possible to extract only subcarrriers of a desired channel out of multiplexed signals of four channels.

Figure 26:
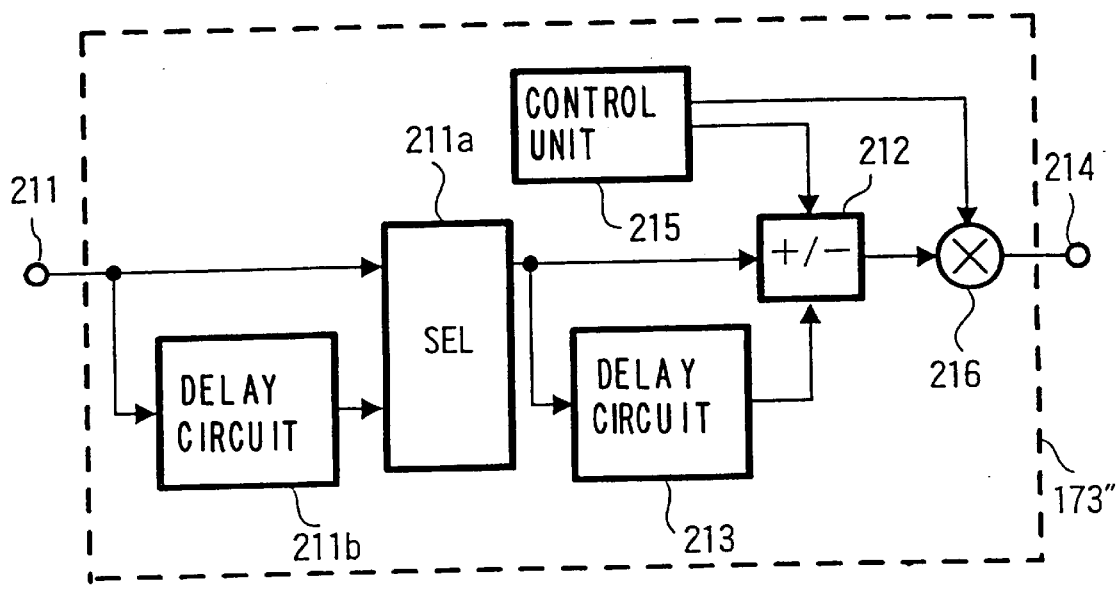
FIG. 26 is a configuration diagram showing still another example of the channel selection unit.

Moreover, for example, when signals of two channels are multiplexed in one transmission band (such as the case where signals of two channels each having a transmission rate of 64 kbps are multiplexed), the channel selection unit for extracting the signal of each channel can be configured, for example, as a channel selection unit 173" shown in FIG. 26. Specifically, a received signal (baseband signal) obtained at a terminal 211 is subjected to symbol repetition processing by using a selector 211a and a delay circuit 211b, and then supplied to a computation unit 212. At the same time, the signal delayed in a delay circuit 213 by a time equivalent to $½^1$ of one modulation time is also supplied to the computation unit 212. The computation unit 212 performs computation processing of either addition processing or subtraction processing under the control of a control unit 215. The output of the computation unit 212 is multiplied by a sine wave in a multiplier 216 to remove the offset frequency, and then supplied to a terminal 214 from which it is supplied to subsequent circuits. By the way, the offset frequency corrected in the multiplier 216 is determined under the control of the control unit 215. Owing to such a configuration, it is possible to extract only subcarrriers of either of the two multiplexed channel signals, by the control on the addition processing or subtraction processing in the computation unit 212 performed by the control unit 215.

For example, in the case where the maximum transmission rate in one transmission band is 128 kbps, it is now assumed that a terminal device desired to support up to 64 kbps as the maximum transmission rate performs reception at a low rate such as 8 kbps. In this case, a channel selection unit corresponding to the maximum transmission rate (64 kbps) in the terminal device may be provided. And after subcarriers on the frequency axis processed as a multi-carrier signal of 64 kbps are transformed to a symbol stream on the time axis, such processing so as to select a desired channel from the symbol stream may be conducted.

Figure 25:
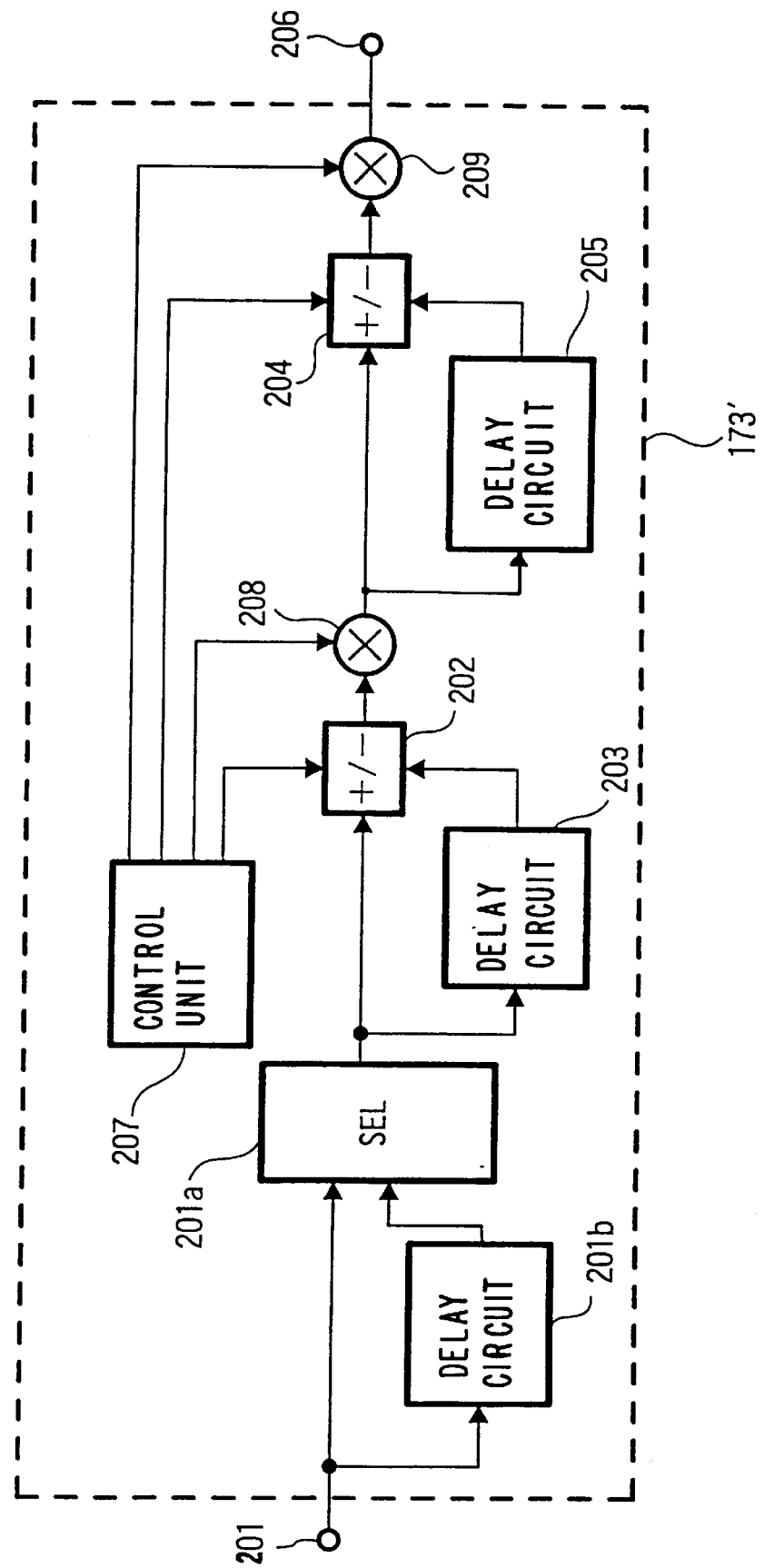
FIG. 25 is a configuration diagram showing another example of the channel selection unit.

On the contrary, in case of such a receiver dedicated to a low rate as supports only 8 kbps, it becomes possible to serially couple processing means corresponding to the computation unit 204 and the delay circuit 205 in FIG. 25 and perform similar processing, thereby enabling the number of output symbols of the channel selection means 173 to be reduced to $½^N$ (where N is the number of stages of coupled processing means) of signal lines possessed by the terminal 201. As for the number of stages within this channel selection means, an arbitrary value can be chosen. This value is determined by the maximum transmission rate supported by that receiver. The delay value in each stage is set to $½^j$ (where j is the number of stages).

In this embodiment, an example of a radio telephone system of the cellular scheme has been supposed. However, the receiver for thus selecting a desired channel out of signals multiplexed to receive the channel can also be applied to a receiver of other systems, such as DAB (Digital Audio Broadcasting) in which broadcast signals of a plurality of channels are multiplexed in the multi-carrier signal.

By applying this receiver, the Fourier transform means included in the receiver needs only be capable of transforming only subcarriers of one channel. As compared with the case where the conventional Fourier transform means capable of transforming all subcarriers of one transmission band is provided, therefore, the configuration of the receiver can be simplified.

A sixth embodiment of the present invention will now be described referring to FIGS. 27 through 30. In the present embodiment as well, an example in which the present invention is applied to a radio telephone system of the cellular scheme is assumed. This is arranged so that, when a plurality of channels are multiplexed in one transmission band, one arbitrary channel among multiplexed channels is used as a pilot channel.

Figure 27:
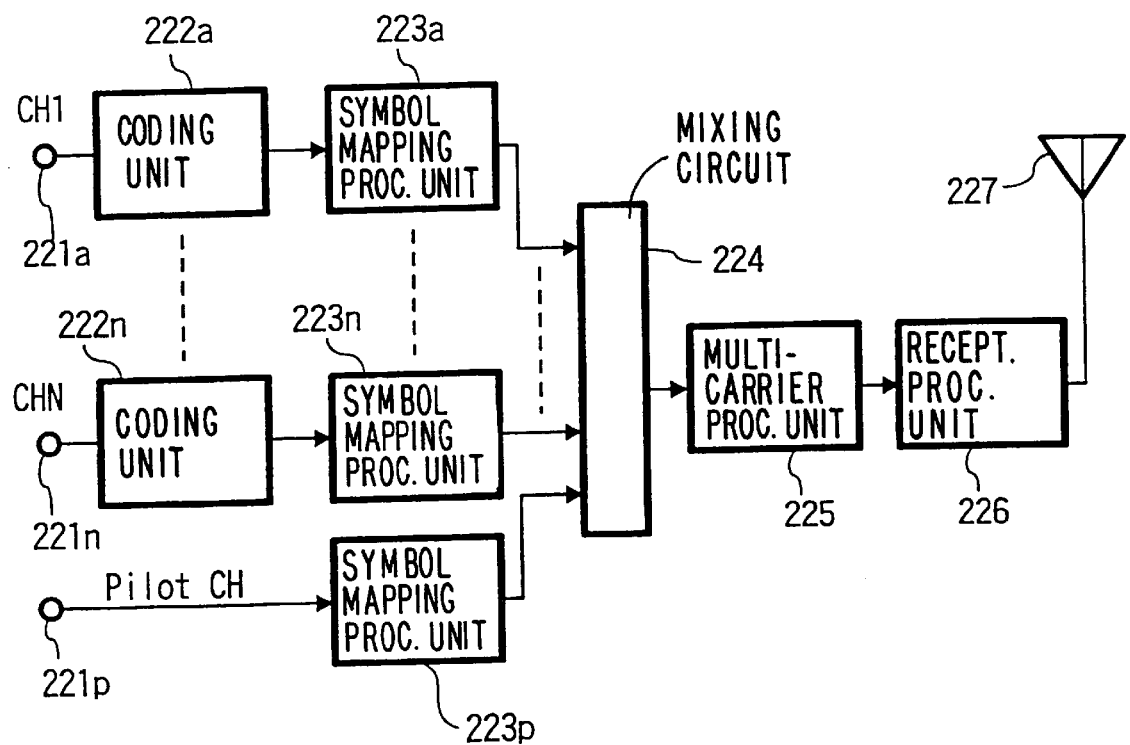
FIG. 27 is a block diagram showing an example of a transmission configuration according to a sixth embodiment of the present invention.

FIG. 27 is a diagram showing the transmission configuration in the present embodiment. It is now assumed that information bit streams of N channels composed of channel 1 through channel N (where N is an arbitrary integer) are obtained at terminals 221a through 221n and a bit stream of a pilot channel is obtained at a terminal 221p. As data of the pilot channel, a predetermined known signal is supplied to the terminal 221p. Besides this known signal, some control data (such as an ID for identifying a base station) may be transmitted. Here, channels (channel 1 through channel N) other than the pilot channel are referred to as traffic channels.

Information bit streams of respective traffic channels obtained at the terminals 221a through 221n are those having the same transmission rate, and supplied to respective different coding units 222a through 222n, where coding processing such as encoding and interleaving is performed individually. The bit streams of respective channels encoded in the coding units 222a through 222n are supplied to separate symbol mapping units 223a through 223n, and are mapped to transmission symbols separately for respective channels. Furthermore, the bit stream of the pilot channel obtained at the terminal 221p is supplied directly to a symbol mapping unit 223p and mapped to transmission symbols.

The transmission symbols generated in the symbol mapping units 223a through 223n and 223p are supplied to a mixing circuit (multiplexer) 224, and mixed into a symbol stream of one system. The mixing processing configuration in this mixing circuit 224 can be made, for example, similar to the processing configuration of the mixing circuit 124 described with reference to FIG. 12 of the second embodiment. Transmission symbols mixed in the mixing circuit 224 are subjected, in a multi-carrier processing unit 225, to processing for converting them to a multi-carrier signal composed of subcarriers arranged on the frequency axis, such as scramble processing, inverse Fourier transform processing, and windowing processing. The generated multi-carrier signal is supplied to a transmission processing unit 226. A high frequency signal is convolved therein, and the transmission signal is converted in frequency to a predetermined frequency band. The transmission signal thus subjected to frequency conversion is radio-transmitted from an antenna 227.

Figure 29:
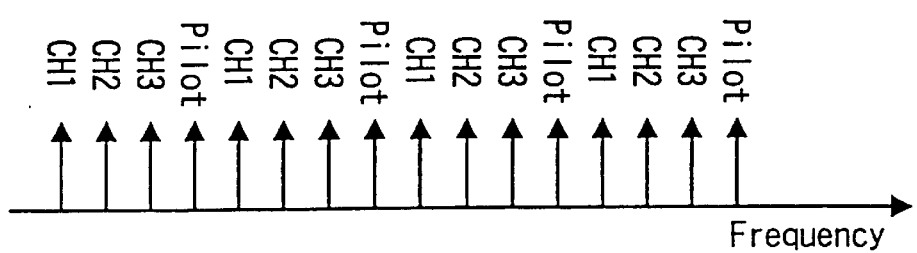
FIG. 29 is a diagram showing an example of a transmission symbol arrangement according to the sixth embodiment of the present invention.

FIG. 29 shows an example of a multiplexed state in one transmission band in the case of a channel configuration thus including the pilot channel. Here, three traffic channels composed of channels 1 through 3 and one pilot channel are multiplexed. In this example, subcarriers of respective channels are arranged in order.

Figure 28:
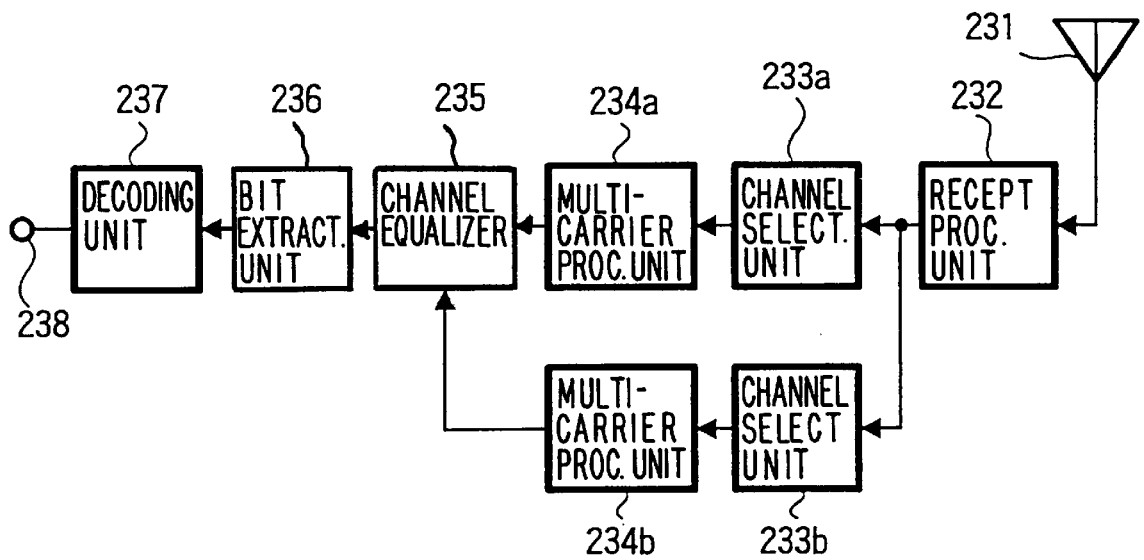
FIG. 28 is a block diagram showing an example of a reception configuration according to the sixth embodiment of the present invention.

A configuration for receiving the signal thus transmitted is shown in FIG. 28. A reception processing unit 232 connected to an antenna 231 receives a signal of a predetermined transmission frequency band and converts it to a baseband signal. The baseband signal thus converted is supplied to first and second channel selection units 233a and 233b. The first channel selection unit 233a performs processing for selecting the subcarriers of a traffic channel to be received. The second channel selection unit 233b performs processing for selecting the subcarriers of the pilot channel. The subcarriers selected in the channel selection units 233a and 233b are supplied to multi-carrier processing units 234a and 234b, respectively, and subjected to processing for transforming subcarriers on the frequency axis to a symbol stream on the time axis, such as Fourier transform processing. The symbol stream of a predetermined traffic channel obtained in the multi-carrier processing unit 234a is supplied to a channel equalizer 235.

This equalizer 235 estimates the transmission path state on the basis of the state of a known signal received via the pilot channel. On the basis of the estimated transmission path state, equalization processing of the transmission path of symbols received via a traffic channel is performed. Synchronous detection of symbols subjected to equalization processing is performed. The detected symbols are supplied to a bit extraction unit 236, where coded bits are extracted. The extracted bit data is supplied to a decoding unit 237 and decoded. The decoded information bit stream is obtained at a terminal 238. Furthermore, data received via the pilot channel is supplied to a control unit of a terminal device which is not illustrated, where control processing based upon that data is performed.

Figure 30:
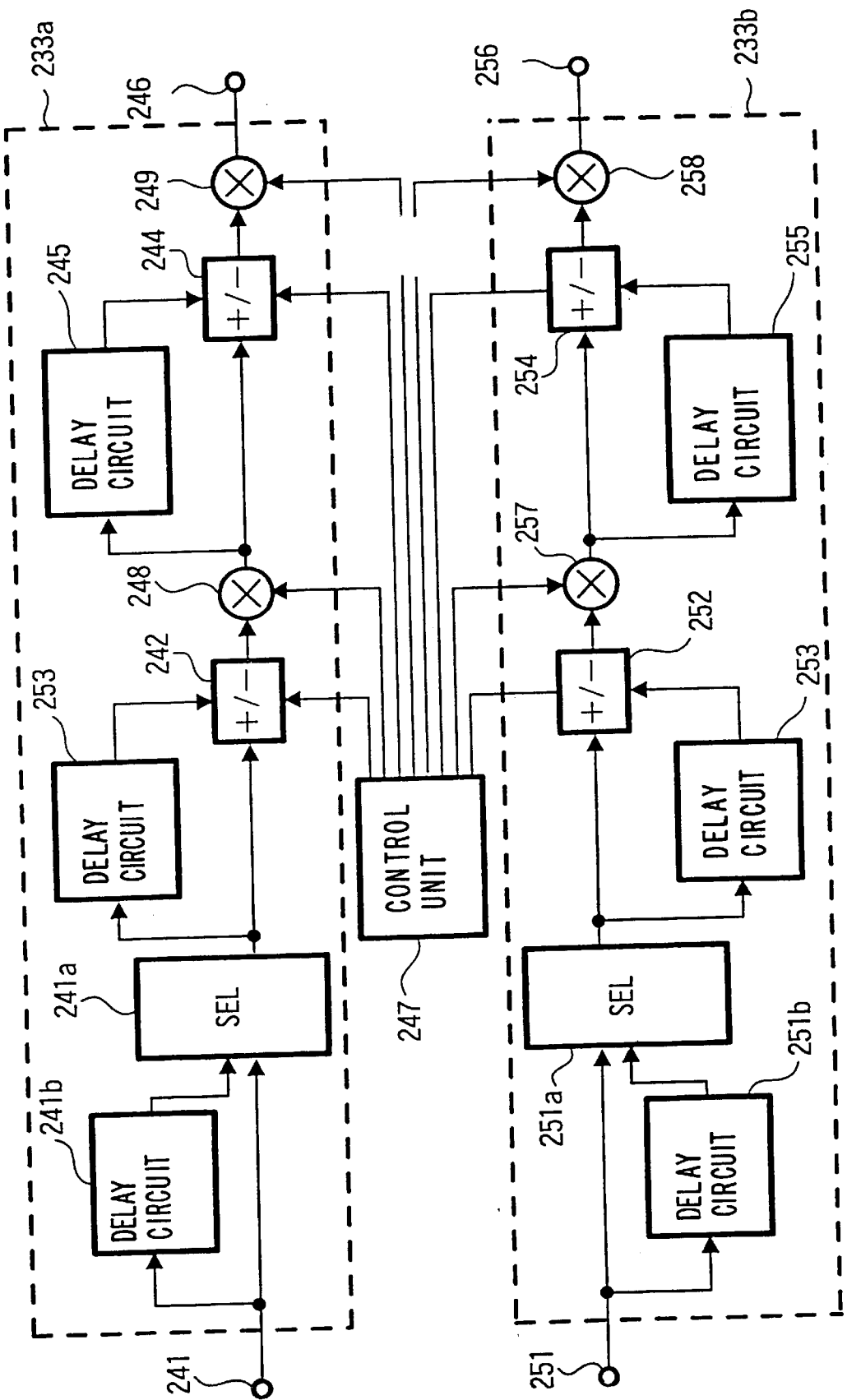
FIG. 30 is a configuration diagram showing an example of a channel selection unit according to the sixth embodiment of the present invention.

The first and second channel selection units 233a and 233b are configured as shown in, for example, FIG. 30. In the first channel selection unit 233a, a signal obtained at a terminal 241 from a preceding circuit is subjected to symbol repetition processing in a selector 241a and a delay circuit 241b and then supplied to a computation unit 242. At the same time, the signal delayed in a delay circuit 243 by a time equivalent to $½^1$ of one modulation time is also supplied to the computation unit 242. The computation unit 242 performs computation processing of either addition processing or subtraction processing under the control of a control unit 247.

The output of the computation unit 242 is multiplied in a multiplier 248 by a sine wave directed from the control unit 247 to remove the offset frequency. A resultant signal is supplied directly to a computation unit 244. At the same time, the signal delayed in a delay circuit 245 by a time equivalent to ¼ (=$½^2$) of one modulation time is also supplied to the computation unit 244. The computation unit 244 performs computation processing of either addition processing or subtraction processing under the control of the control unit 247. The output of the computation unit 244 is multiplied in a multiplier 249 by a sine wave directed from the control unit 247 to remove the offset frequency. Thereafter, a resultant signal is supplied from a terminal 246 to subsequent circuits.

Furthermore, in the second channel selection unit 233b, a signal obtained at a terminal 251 from a preceding circuit is subjected to symbol repetition processing in a selector 251a and a delay circuit 251b and then supplied to a computation unit 252. At the same time, the signal delayed in a delay circuit 253 by a time equivalent to $½^1$ of one modulation time is also supplied to the computation unit 252. The computation unit 252 performs computation processing of either addition processing or subtraction processing under the control of the control unit 247. The output of the computation unit 252 is multiplied in a multiplier 257 by a sine wave directed from the control unit 247 to remove the offset frequency. A resultant signal is supplied directly to a computation unit 254. At the same time, the signal delayed in a delay circuit 255 by a time equivalent to ¼ (=$½^2$) of one modulation time is supplied to the computation unit 254. The computation unit 254 performs computation processing of either addition processing or subtraction processing under the control of the control unit 247. The output of the computation unit 254 is multiplied in a multiplier 258 by a sine wave directed from the control unit 247 to remove the offset frequency. Thereafter, a resultant signal is supplied from a terminal 256 to subsequent circuits. Owing to such a configuration, it is possible to extract subcarriers of a desired traffic channel in the first channel selection unit 233a and extract subcarriers of the pilot channel in the second channel selection unit 233b, on the basis of the control of the control unit 247.

By virtue of such a configuration, it becomes possible to perform the transmission path estimation on the basis of a known signal (pilot signal) transmitted via a pilot channel, and perform transmission and reception by using synchronous detection. As a result, better transmission characteristics can be obtained as compared with those when the differential modulation is performed. Furthermore, as regards channels transmitted from the same station, basically mutual orthogonality is maintained and consequently they do not become interference sources. Only signals transmitted from other base stations exert influences as interference. In such a case, since pilot signals are transmitted from respective base stations, by using the pilot signals and adaptive array antennas or the like, it is also possible to cancel the interference. In this embodiment also, an example in which four channels are multiplexed has been described. In the same way as the examples described with reference to other embodiments, however, it is possible to form such a configuration as to conduct various kinds of multiplex communication with the basic multiplexing number of $2^N$.

Figure 31:
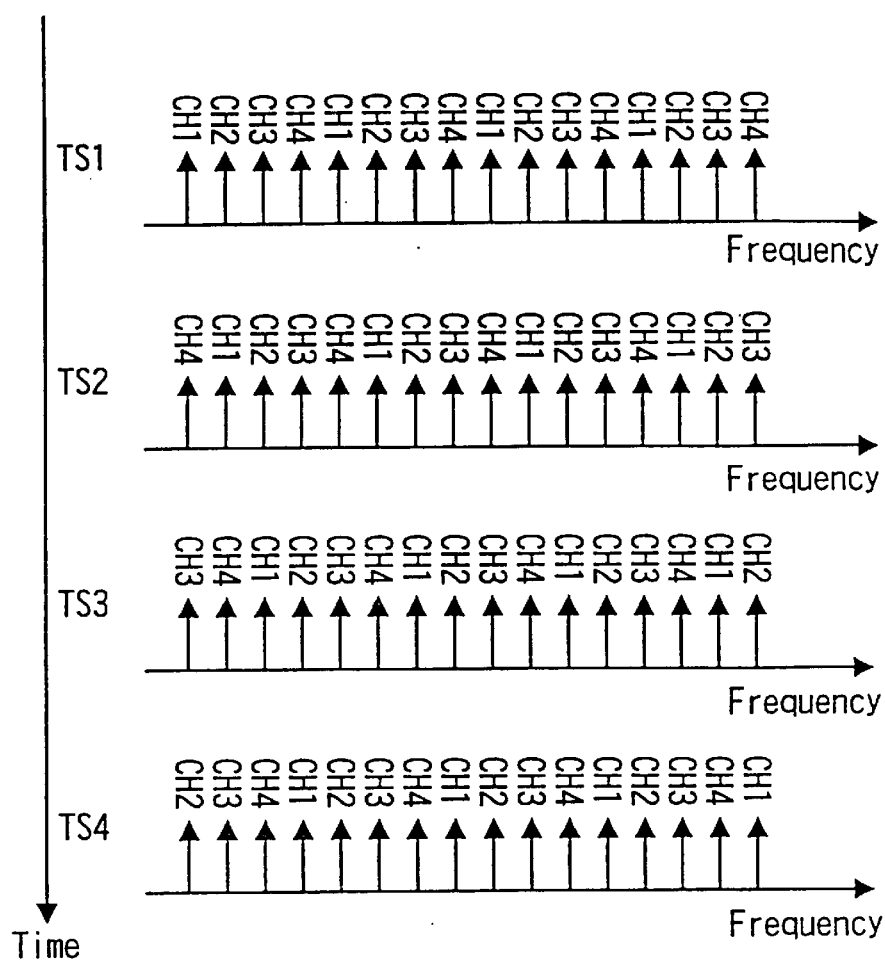
FIG. 31 is a diagram for description showing an example of a subcarrier arrangement generated by other processing in respective embodiments of the present invention.

In the embodiments heretofore described, processing in one modulation unit has been described. As a matter of fact, however, this processing is executed repetitively on the time axis. By changing the correspondence of logic channels to physical channels in one modulation time unit, therefore, it becomes possible to conduct communication by using all frequencies of the system band even in a channel of a low transmission rate. FIG. 31 shows one example of this case. For time slots TS1, TS2, TS3, . . . , the arrangement of subcarriers of the logic channels CH1 through CH4 is changed from time slot to time slot. Here, a periodic change having four time slots as one period is shown. As to the correspondence of logic channels to physical channels, the hopping pattern in the existing frequency hopping system may preferably be used.

Figure 32:
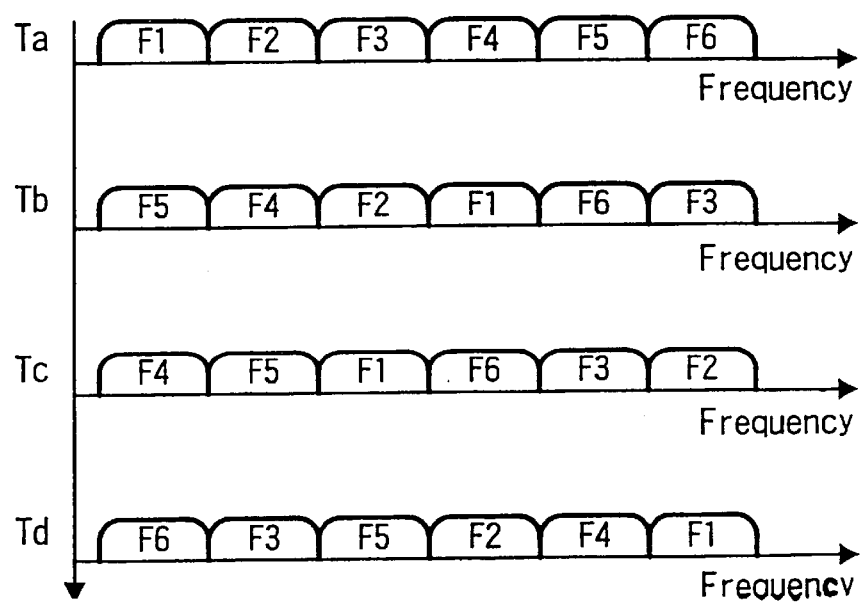
FIG. 32 is a diagram showing frequency hopping processing applied to respective embodiments of the present invention.

Furthermore, in the above described embodiments, only processing in one transmission band has been described. When a plurality of transmission bands are prepared, however, processing to shuffle the frequency band called frequency hopping may be performed. FIG. 32 shows an example in this case. When six transmission bands F1 through F6 (one transmission band corresponds to one transmission band in each embodiment) are prepared, for example, bands F1, F2, F3, F4, F5 and F6 are arranged in frequency increasing order at communication time Ta. Subsequently, for communication times Tb, Tc, and Td, the arrangement of bands is changed every predetermined time unit. In this case as well, a periodic change is used. By thus performing the frequency hopping, a greater frequency diversity effect can be obtained. Furthermore, both the processing of changing the arrangement of subcarriers in each band as shown in FIG. 31 and the frequency hopping processing for each band as shown in FIG. 32 may be used in combination.

Moreover, in the above described embodiments, details of the modulation and demodulation processing in transmission by using a multi-carrier signal have not been described. When assigning a plurality of subcarriers on the frequency axis to one channel as described with respective embodiments, it is possible to perform differential modulation (phase modulation or amplitude modulation) between adjacent subcarriers assigned to that channel for transmission and perform inverse demodulation processing (i.e., differential demodulation processing between adjacent subcarriers assigned to that channel) on the reception side. For example, in a radio telephone system of the cellular scheme or the like, this processing can be applied to the communication of an up line from a terminal device to the base station. Furthermore, this processing can also be applied to the communication of a down line from the base station to a terminal device.

For example, when the terminal device is moving at high speed, there is a possibility that fading correlation between symbols becomes low and the characteristics are degraded in the case where this processing is not performed. By performing the processing of the present example, however, correlation between symbols becomes high and favorable reception becomes possible in differential demodulation which can be executed by processing simpler than the synchronous detection. Favorable transmission which does not depend on the moving speed of the terminal device thus becomes possible.

Furthermore, when assigning a plurality of subcarriers on the frequency axis to one channel, it is possible to perform differential modulation (phase modulation or amplitude modulation) between adjacent subcarriers on the frequency axis for transmission no matter whether subcarriers are assigned to the same channel, and to performs inverse demodulation processing (i.e., differential demodulation processing between adjacent subcarriers) on the reception side. For example, in a radio telephone system of the cellular scheme or the like, this processing can be applied to the communication of an up line from a terminal device to the base station, and can also be applied to the communication of a down line from the base station to a terminal device.

The differential modulation processing and differential demodulation processing which have been described here can also be applied to the case where the number of subcarriers is not an Nth power of 2 unlike the embodiments.

In the above described embodiments, examples of application to the radio telephone system and DAB (Digital Audio Broadcasting) have been mainly described. Needless to say, the present invention can also be applied to other various transmission systems which perform multiplex transmission using similar multi-carrier signals. Moreover, values of the transmission rates, frequency intervals, multiplexing number, and the like shown in various embodiments have been indicated merely as examples. It is a matter of course that other values can be used.

What is claimed is:

1. A communication method comprising the steps of:
   setting a plurality of channels in a predetermined band; and
   conducting communication in each of the plurality of set channels by using a multi-carrier signal having transmission symbols distributed among a plurality of subcarriers,
   wherein the transmission symbols of each channel of the plurality of set channels on a frequency axis are arranged at intervals of an $N^{th}$ power of 2, wherein N is an arbitrary positive number, with respect to a reference frequency interval.

2. The communication method according to claim 1, wherein said communication is radio communication.

3. The communication method according to claim 1, wherein a value of N is variably set depending on a bit rate of transmission data.

4. The communication method according to claim 1, wherein said communication method is applied to communication between a base station and a terminal device;
   one channel in a plurality of down channels transmitted from the base station is secured as a pilot channel, and remaining channels in the plurality of down channels are used as traffic channels;
   in the base station, a known signal is transmitted by using the pilot channel; and
   in the terminal device, equalization processing of a transmission path of symbols received via one of the traffic channels is performed by using symbols received via the pilot channel, and synchronous detection of the symbols received via one of the traffic channels and the symbols received via the pilot channel is performed.

5. The communication method according to claim 1, wherein a signal to be transmitted is subjected to frequency hopping by a taking a channel of the plurality of set channels as a unit or by taking a frequency as a unit.

6. A communication method comprising the steps of:
   setting a plurality of channels in a predetermined band;
   conducting communication in each of the plurality of set channels by using a multi-carrier signal having transmission symbols distributed among a plurality of subcarriers;
   assigning a predetermined number of subcarriers from the plurality of subcarriers to each channel of the plurality of set channels;
   performing differential modulation between adjacent subcarriers among the predetermined number of subcarriers assigned to each channel of the plurality of set channels and thereafter performing transmission; and
   performing differential demodulation between the adjacent subcarriers, on a reception side.

7. The communication method according to claim 6, wherein on a transmission side, differential modulation is performed between the adjacent subcarriers on a frequency axis instead of performing differential modulation between the adjacent subcarriers among the predetermined number of subcarriers assigned to each channel of the plurality of set channels; and
   on the reception side, differential demodulation is performed between the adjacent subcarriers on a frequency axis instead of performing differential demodulation between the adjacent subcarriers among the predetermined number of subcarriers assigned to each channel of the plurality of set channels.

8. A transmitter comprising:
   means for generating a multi-carrier signal having transmission symbols distributed among a plurality of subcarriers,
   wherein the transmission symbols on a frequency axis in one channel of said multi-carrier signal are arranged at intervals of an $N^{th}$ power of 2, where N is an arbitrary positive number, with respect to a reference frequency interval; and
   means for transmitting the generated multi-carrier signal as a predetermined channel among a plurality of channels set in a predetermined band.

9. The transmitter according to claim 8, wherein a value of N is variably set according to a bit rate of transmission data.

10. The transmitter according to claim 8, wherein transmission symbols of the plurality of channels are individually generated, and thereafter a multiplexed symbol sequence is generated by arranging symbols of respective channels symbol by symbol;

multi-carrier signal generation processing is performed on the generated multiplexed symbol sequence collectively; and transmission processing is performed on the plurality of channels collectively.

11. The transmitter according to claim 8, wherein transmission symbols are generated, the generated transmission symbols being taken out as a signal on a time axis, and thereafter processing for convolving a frequency offset corresponding to a channel assigned to its own station is performed.

12. The transmitter according to claim 8, wherein a known signal is transmitted by using one channel among the plurality of channels as a pilot channel, and transmission processing is performed by using remaining channels in the plurality of channels as traffic channels.

13. The transmitter according to claim 8, comprising frequency hopping means for performing frequency hopping on the generated multi-carrier signal by taking a channel of the plurality of channels as a unit or taking a predetermined frequency band as a unit.

* * * * *